(12) United States Patent
McCalmont et al.

(10) Patent No.: US 12,528,370 B2
(45) Date of Patent: Jan. 20, 2026

(54) ELECTRIC VEHICLE CHARGING SYSTEMS AND METHODS

(71) Applicant: Paired Power, Inc., Campbell, CA (US)

(72) Inventors: David Thompson McCalmont, Palo Alto, CA (US); Jonathan Scott McCalmont, San Jose, CA (US); Aaron William McCalmont, Santa Clara, CA (US)

(73) Assignee: Paired Power, Inc., Campbell, CA (US)

( * ) Notice: Subject to any disclaimer, the term of this patent is extended or adjusted under 35 U.S.C. 154(b) by 936 days.

(21) Appl. No.: 17/734,030

(22) Filed: Apr. 30, 2022

(65) Prior Publication Data

US 2022/0250486 A1    Aug. 11, 2022

Related U.S. Application Data

(63) Continuation-in-part of application No. 16/672,091, filed on Nov. 1, 2019, now Pat. No. 11,318,850, which is a continuation-in-part of application No. 15/834,969, filed on Dec. 7, 2017, now abandoned, which is a continuation of application No. 14/720,270, filed on May 22, 2015, now Pat. No. 9,868,357.

(60) Provisional application No. 62/062,087, filed on Oct. 9, 2014.

(51) Int. Cl.
*B60L 53/00* (2019.01)
*B60L 53/51* (2019.01)
*H02J 1/10* (2006.01)
*H02J 7/35* (2006.01)

(52) U.S. Cl.
CPC .............. *B60L 53/00* (2019.02); *B60L 53/51* (2019.02); *H02J 1/10* (2013.01); *H02J 7/35* (2013.01); *Y02B 10/10* (2013.01); *Y02E 10/56* (2013.01); *Y02E 60/00* (2013.01); *Y02T 10/70* (2013.01); *Y02T 10/7072* (2013.01); *Y02T 90/14* (2013.01); *Y04S 10/126* (2013.01)

(58) Field of Classification Search
CPC ... B60L 53/00; H02J 1/10; H02J 3/383; H02J 7/35; Y02B 10/10; Y02E 10/56; Y02E 60/00; Y02T 10/70; Y02T 10/7072; Y02T 90/14; Y04S 10/126
USPC ............................................. 320/101
See application file for complete search history.

(56) References Cited

U.S. PATENT DOCUMENTS

| | | |
|---|---|---|
| 4,175,249 A | 11/1979 | Gruber |
| 4,182,960 A | 1/1980 | Reuyl |
| 4,186,336 A | 1/1980 | Weinberg |

(Continued)

FOREIGN PATENT DOCUMENTS

| | | |
|---|---|---|
| BR | 102018003866 A | 9/2019 |
| DE | 102009039884 | 3/2011 |

(Continued)

*Primary Examiner* — Suresh Memula

(57) ABSTRACT

Example electric vehicle charging systems and methods are described. In one example, multiple solar cells are configured to generate energy. A vehicle control system is coupled to the multiple solar cells and determines which of multiple electric vehicles to charge using energy from the multiple solar cells. The vehicle control system determines which electric vehicle to charge based on at least one environmental condition near the multiple solar cells.

18 Claims, 16 Drawing Sheets

(56) References Cited

U.S. PATENT DOCUMENTS

| | | | |
|---|---|---|---|
| 4,794,272 A * | 12/1988 | Bavaro | H02J 7/35 307/64 |
| 5,923,100 A * | 7/1999 | Lukens | G05F 1/67 307/64 |
| 6,111,391 A * | 8/2000 | Cullen | G05F 1/67 323/299 |
| 6,218,605 B1 | 4/2001 | Dally | |
| 6,262,558 B1 | 7/2001 | Weinberg | |
| 6,281,485 B1 * | 8/2001 | Siri | G05F 1/67 320/150 |
| 7,531,741 B1 | 5/2009 | Melton | |
| 7,828,099 B2 * | 11/2010 | Heckeroth | B60K 1/00 180/2.2 |
| 8,022,667 B2 | 9/2011 | Anderson | |
| 8,120,308 B2 | 2/2012 | Ward | |
| 8,143,841 B2 | 3/2012 | Gochenaur | |
| 8,387,318 B2 | 3/2013 | Kaufman | |
| 9,566,867 B2 | 2/2017 | Kydd et al. | |
| 9,641,021 B2 | 5/2017 | Gong et al. | |
| 9,868,357 B2 | 1/2018 | McCalmont et al. | |
| 2004/0065025 A1 | 4/2004 | Durham | |
| 2009/0266397 A1* | 10/2009 | Gibson | H02S 40/38 320/101 |
| 2010/0181957 A1* | 7/2010 | Goeltner | B60L 53/64 320/101 |
| 2010/0231045 A1 | 9/2010 | Collins et al. | |
| 2011/0115295 A1 | 5/2011 | Moon et al. | |
| 2011/0193515 A1* | 8/2011 | Wu | H02J 7/35 320/101 |
| 2011/0301790 A1* | 12/2011 | Atluri | B60L 58/20 180/65.265 |
| 2012/0074893 A1 | 3/2012 | Cole et al. | |
| 2012/0133322 A1 | 5/2012 | Walsh et al. | |
| 2012/0161692 A1* | 6/2012 | Kobayashi | B60L 58/13 320/109 |
| 2012/0313568 A1 | 12/2012 | Paluszek et al. | |
| 2013/0073428 A1 | 3/2013 | Thramann | |
| 2013/0076294 A1 | 3/2013 | Smith | |
| 2013/0080254 A1 | 3/2013 | Thramann | |
| 2013/0221918 A1 | 8/2013 | Hill et al. | |
| 2014/0077626 A1 | 3/2014 | Levy | |
| 2014/0191568 A1* | 7/2014 | Partovi | H02J 50/60 307/31 |
| 2014/0196387 A1 | 7/2014 | Neito et al. | |
| 2014/0197684 A1* | 7/2014 | Masato | B60L 53/68 320/101 |
| 2014/0217983 A1* | 8/2014 | McCalmont | H02J 3/381 307/76 |
| 2015/0008865 A1* | 1/2015 | Wang | H05B 45/375 315/308 |
| 2015/0028795 A1* | 1/2015 | Cho | H02J 7/35 320/101 |
| 2015/0321570 A1* | 11/2015 | Cun | B60L 53/11 320/109 |
| 2016/0134140 A1* | 5/2016 | Tittle | H02J 7/0042 320/101 |
| 2017/0141718 A1* | 5/2017 | Anderson | H10F 77/00 |
| 2022/0379763 A1 | 12/2022 | Kydd et al. | |
| 2022/0396167 A1 | 12/2022 | Sharifipour et al. | |

FOREIGN PATENT DOCUMENTS

| | | | |
|---|---|---|---|
| EP | 0051959 | 5/1982 | |
| EP | 1160876 | 12/2001 | |
| EP | 1626140 | 2/2006 | |
| EP | 2292877 | 3/2011 | |
| WO | 2011140557 | 11/2011 | |
| WO | 2013057325 | 4/2013 | |
| WO | WO-2014087426 A2 * | 6/2014 | B60L 3/12 |
| WO | 2015103164 A1 | 7/2015 | |
| WO | WO-2016171990 A1 * | 10/2016 | H02J 3/385 |

* cited by examiner

ELECTRIC VEHICLE CHARGING SYSTEMS AND METHODS

CROSS REFERENCE TO RELATED APPLICATIONS

This application is a Continuation in Part of U.S. application Ser. No. 16/672,091, entitled "Electric Vehicle Charging Systems and Methods," filed Nov. 1, 2019, the disclosure of which is incorporated herein by reference in its entirety. That application is a Continuation in Part of U.S. application Ser. No. 15/834,969, entitled "Electric Vehicle Charging Systems and Methods," filed Dec. 7, 2017, the disclosure of which is incorporated herein by reference in its entirety. That application is a Continuation of U.S. Pat. No. 9,868,357, entitled "Electric Vehicle Charging Systems and Methods," issued Jan. 16, 2018, the disclosure of which is incorporated herein by reference in its entirety. That application claims the benefit of U.S. Provisional Application Ser. No. 62/062,087, entitled "Electric Vehicle Charging Systems and Methods," filed Oct. 9, 2014, the disclosure of which is incorporated herein by reference in its entirety.

TECHNICAL FIELD

The present disclosure relates to systems and methods for charging electric vehicles.

BACKGROUND

The growing use of electric vehicles requires an increased number of charging locations capable of recharging the batteries contained in the electric vehicles. Some retail locations and commercial campuses provide limited parking spaces with electric vehicle charging connections. Providing electric power to parking spaces for the purpose of charging electric vehicles typically requires installing electric power lines across part of the parking area. This installation of power lines can be costly, especially when the source of the electric power is a significant distance from the parking area. Additionally, existing electric power panels (or other electric circuits) may not have enough additional capacity and may need to be upgraded to support charging of electric vehicles. Thus, installation of electric vehicle charging connections in parking areas can be difficult and expensive. Additionally, in rural areas and farming environments, access to the traditional power grid may be difficult or expensive to achieve.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
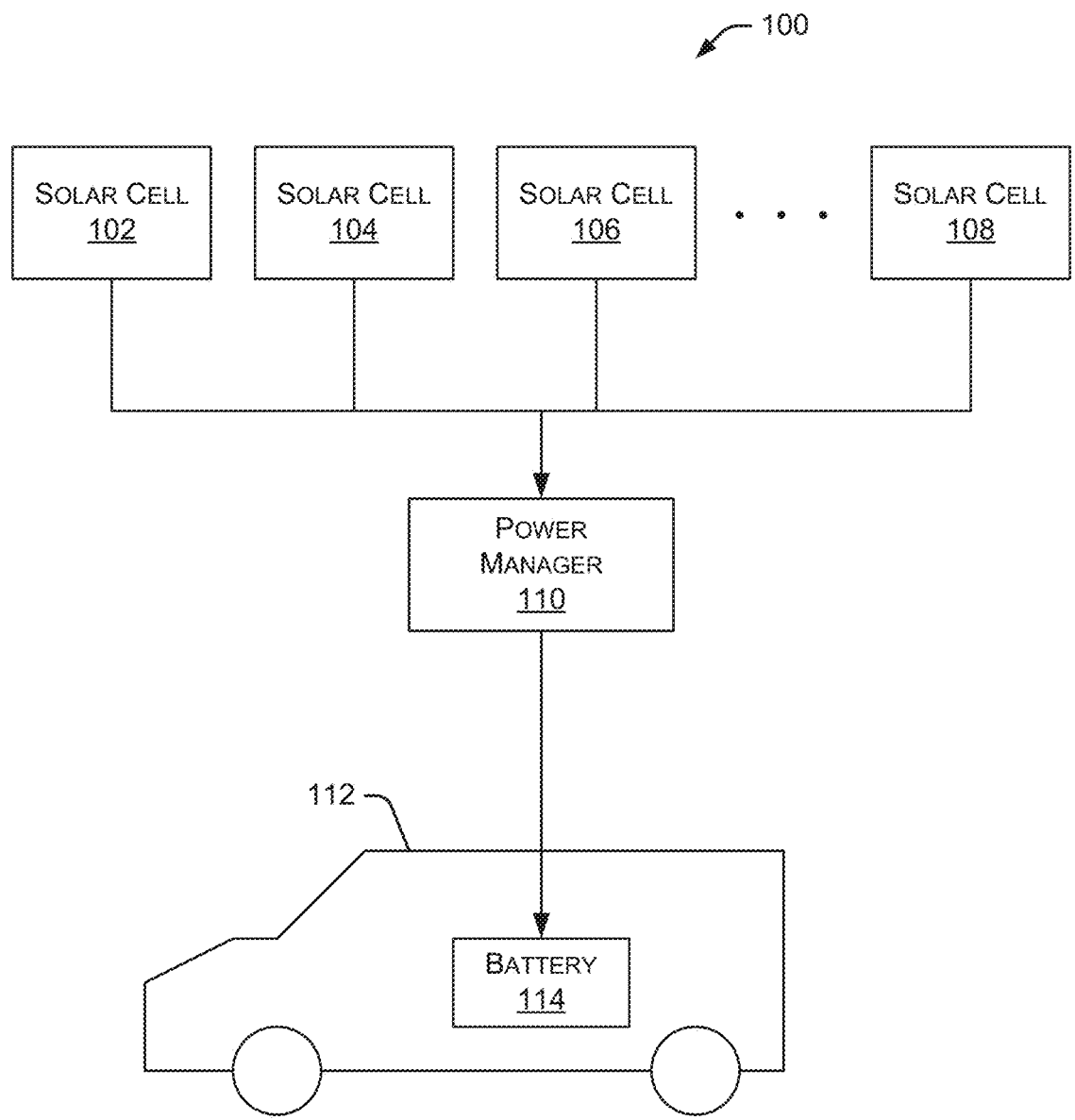
FIG. 1 is a block diagram depicting an embodiment of an electric vehicle charging system.

In the following description, reference is made to the accompanying drawings that form a part thereof, and in which are shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, system, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit,"

"module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flow diagram and/or block diagram block or blocks.

The systems and methods described herein support the charging of one or more electric vehicles. In some embodiments, the systems and methods can charge multiple electric vehicles simultaneously using one or more arrays of solar cells, photovoltaic modules, and the like. As used herein, "solar cells" refers to any photovoltaic module or other mechanism that converts solar energy into an electrical signal. As described herein, certain implementations can charge one or more electric vehicles directly from the solar cells without the need for an intermediate battery to store the energy collected from the solar cells.

The systems and methods described herein support the charging of one or more electric vehicles using solar cells and other power sources. The use of solar cells allows charging locations to be created without the need for a connection to a traditional power grid. This simplifies creation of the charging locations and avoids problems caused by fully utilized electrical panels and other electrical circuits. These systems and methods eliminate the time and expense required to create buried or overhead connections for power lines connected to the power grid.

Some embodiments may include a connection to the power grid in addition to solar cells and other power sources. For example, certain embodiments can avoid the occurrence of demand charges and other costs of grid-only systems. When demand charges are high, the system can access power from solar cells or other power sources. When grid-based power is less expensive, or when solar power is not available (e.g., at night), the system may access power from the grid.

Charging locations, as discussed herein, can be located anywhere, but are particularly useful in areas where drivers park their electric vehicles for a period of time, such as a corporate campus, shopping center, retail store, school, convention center, sports arena, apartment building, and the like. As adoption of electric vehicles grows and becomes more prevalent, the demand for charging locations that provide a charge over an extended period of time, such as workplace charging, will increase. In these types of locations, drivers of electric vehicles can enjoy the convenience of charging their vehicle while working, shopping, or performing other activities. Providing these charging locations is beneficial to, for example, business owners and employers who want to provide charging stations for drivers and/or employees without incurring costly installations requiring access to the power grid.

FIG. 1 is a block diagram depicting an embodiment of an electric vehicle charging system 100. Multiple solar cells 102, 104, 106 and 108 are electrically coupled to a power manager 110. Solar cells 102-108 provide power signals to power manager 110. These power signals may include a voltage and/or a current. Power manager 110 is electrically coupled to one or more electric vehicles 112, each of which includes one or more batteries 114. Power manager 110 may perform a variety of functions, such as consolidating power signals received from solar cells 102-108. The power signals from solar cells 102-108 are consolidated into an output signal that is provided to electric vehicle 112.

In some embodiments, power manager 110 can adjust the voltage level of an output signal provided to electric vehicle 112 for charging that electric vehicle. Power manager 110 maintains the output voltage level within an acceptable range for the vehicle being charged. In some embodiments, power manager 110 can adjust the current level of the output signal provided to electric vehicle 112. For example, power manager 110 can maintain the output current level within an acceptable range for the vehicle being charged. As used herein, the "output signal" may contain a voltage and/or a current. In some embodiments, power manager 110 includes a passive switching matrix or an active device, such as a DC-to-DC converter or a computer-managed power boost or buck system. In other embodiments, power manager 110 includes an inverter or similar mechanism to deliver power to one or more electric vehicles. Some electric vehicles are charged through an L3 (Level 3) port using DC, while other electric vehicles are charged through an L2 (Level 2) port using AC. As frequently used in the electric vehicle EV industry, Level 1 refers to a 120 VAC charging port, Level 2 refers to a 240 VAC charging port, and Level 3 refers to ports with higher charging voltages, such as 3-phase power (208 VAC or 480 VAC) or direct DC. Typically, the rate of charge (i.e., the speed at which an electric vehicle can be charged) is lowest for Level 1 ports. Level 2 ports can generally charge at a faster rate than Level 1 ports, and Level 3 ports can generally charge faster than Level 2 ports. For example, in some embodiments, a Level 1 port may charge an electric vehicle in approximately 15 hours. A Level 2 port may charge the same electric vehicle in approximately four hours, and a Level 3 port may charge the same electric vehicle in approximately 30 minutes. However, some electric vehicles include onboard chargers that regulate (or restrict) the rate at which the electric vehicle can be charged, regardless of the charging level. In some electric vehicle or electric vehicle charger implementations, Level 1 and Level 2 ports are discussed with respect to AC charging and Level 3 ports are discussed with respect to DC charging.

Using an inverter, the system can receive DC power from a solar cell, convert the power to AC (with the inverter), and deliver the AC power to the electric vehicle's Level 2 port. Electric vehicle 112 may be any type of car, truck, bus, motorcycle, scooter, bicycle, and the like. Battery 114 stores a charge within electrical vehicle 112 to power that electric vehicle.

Figure 2:
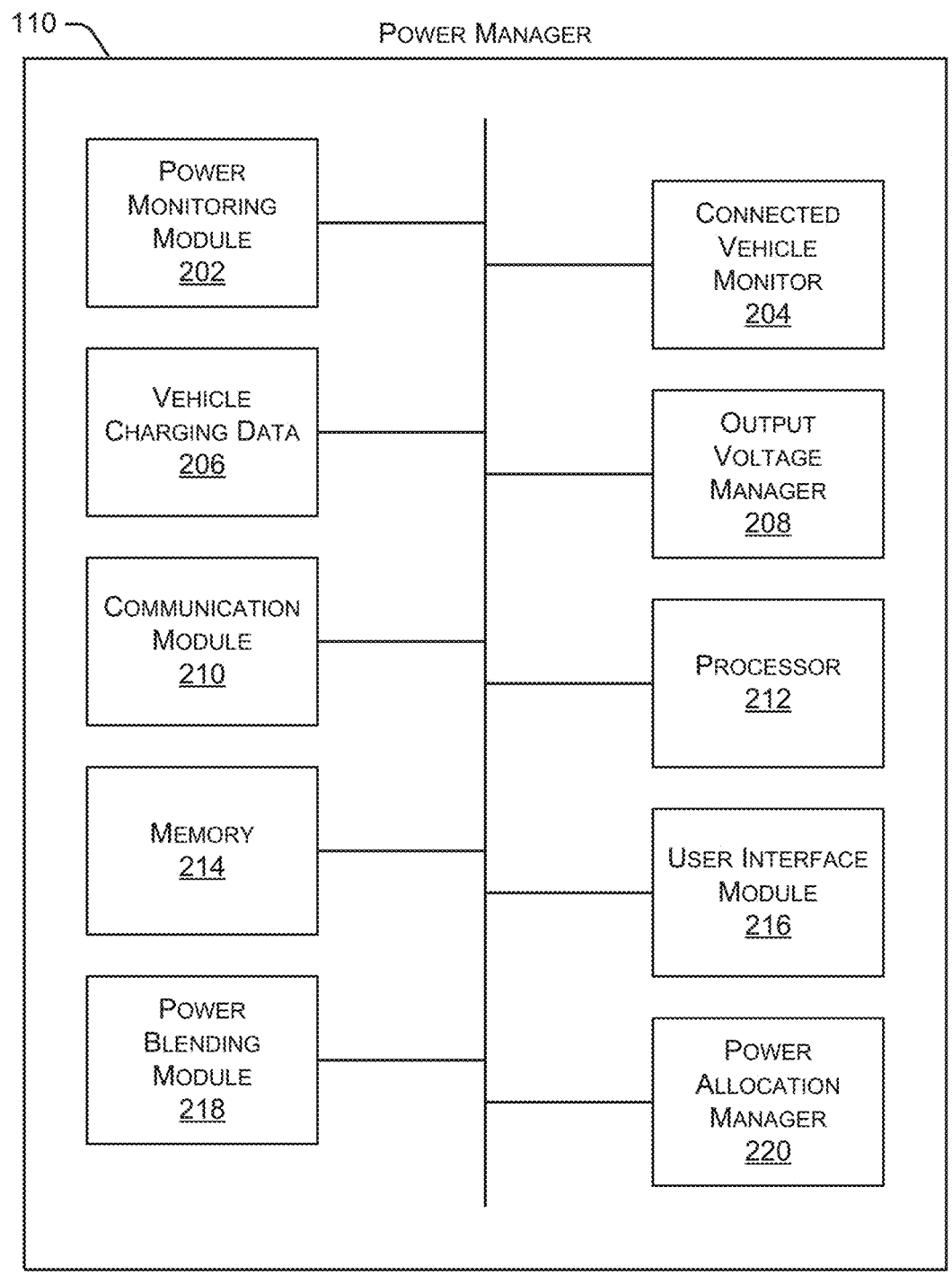
FIG. 2 is a block diagram depicting an embodiment of a power manager.

FIG. 2 is a block diagram depicting an embodiment of power manager 110. In this example, power manager 110 includes a power monitoring module 202 and a connected vehicle monitor 204. Power monitoring module 202 is capable of monitoring the power received from solar cells 102-108, a power grid, or a battery. Connected vehicle monitor 204 operates to monitor one or more electric vehicles 112 connected to power manager 110. For example, connected vehicle monitor 204 may monitor a vehicle type, a type of charger required (such as Level 2 or Level 3) and an active charging status (such as state of charge, or SOC, percentage) of the vehicle's battery 114.

Power manager 110 also includes vehicle charging data 206 and an output voltage manager 208. Vehicle charging data 206 may include how much power has been provided to a particular electric vehicle 112 during any time period (e.g., power provided during the current day, week, month and so forth.) Output voltage manager 208 monitors and adjusts, as needed, the voltage level of the output signal provided to electric vehicle 112. In some embodiments, output voltage manager 208 also monitors and adjusts the level of the current (or any other signal characteristics) associated with the output signal provided to electric vehicle 112. In alternate embodiments, output voltage manager 208 is referred to as an "output signal manager." In additional embodiments, output voltage manager 208 may include (or may utilize) an inverter that allows output voltage manager 208 to convert DC signals to AC signals, as well as manage voltage and current.

In some embodiments, power manager 110 includes a communication module 210 and a processor 212. Communication module 210 allows power manager 110 to communicate with other systems or devices via any communication medium and using any communication protocol. Processor 212 performs various functions necessary to perform the methods and operations discussed herein with respect to charging electric vehicles. A memory 214 stores various data used by the described systems and methods as well as other components and modules in power manager 110. A user interface module 216 allows a user to interact with power manager 110 and perform various operations, such as entry of user requirements, system configuration, data access, data reporting, user billing, and the like. A power blending module 218 manages the blending (or consolidation) of power signals from one or more sources (e.g., solar cells, external battery, another electric vehicle or a power grid). A power allocation manager 220 handles the allocation of power resources among multiple electric vehicles. For example, power allocation manager 220 may allocate power received from multiple solar cells among the electric vehicles currently being charged. The allocation may distribute the power equally among all electric vehicles or may distribute the power, for example, in proportion to the charging needs of each electric vehicle, the time available to charge each electric vehicle or the fee paid by each vehicle owner to charge their electric vehicle.

Figure 3:
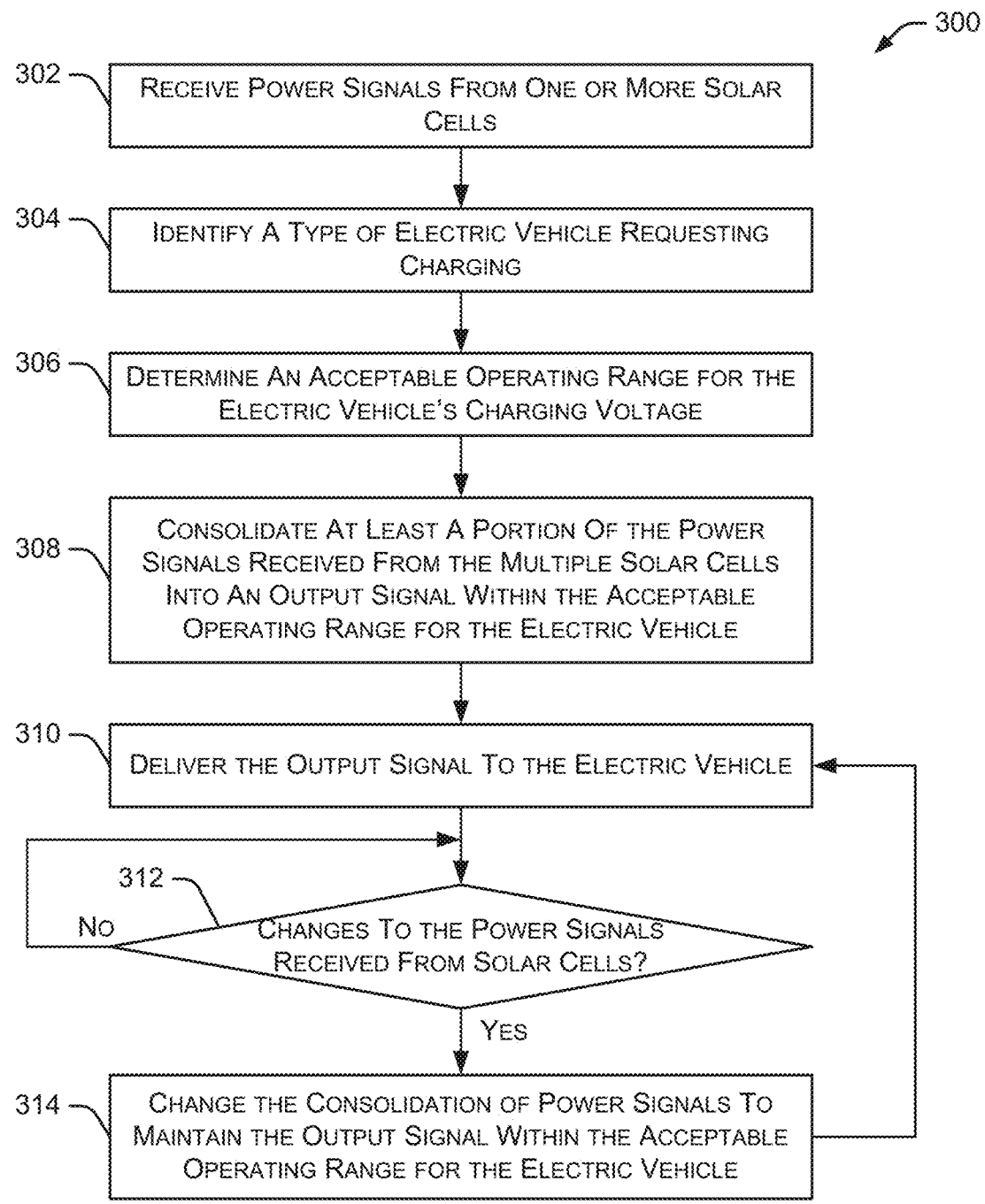
FIG. 3 is a flow diagram depicting an embodiment of a method for charging an electric vehicle.

FIG. 3 is a flow diagram depicting an embodiment of a method 300 for charging an electric vehicle. Method 300 is implemented, for example, within power manager 110. Initially, a power signal is received from one or more solar cells at 302. Method 300 identifies a type of electric vehicle requesting charging at 304 and determines an acceptable operating range for the electric vehicle's charging voltage at 306. In some embodiments, to determine the type of electric vehicle, method 300 uses a CANbus (Controller Area Network bus) and CHAdeMO specification to communicate with the electric vehicle. Once the described systems and methods begin communicating with the electric vehicle, the IV curve (Current-Voltage, discussed below) is used to adjust the voltage. The communication with the electric vehicle can indicate the acceptable operating range for the electric vehicle's charging voltage. In some embodiments, the type of electric vehicle is determined based on the battery voltage of the electric vehicle or the manner in which the electric vehicle communicates signals over the CANbus or CHAdeMO connection.

Most batteries in electric vehicles expect a certain voltage to charge. Solar panels are capable of providing different voltages and follow the IV curve (discussed below) to the voltage being requested by the electric vehicle. The solar panels deliver the current that is available based on the IV curve (which is based on the presently available light intensity). Since batteries do not have IV curves, they need a particular voltage (or voltage range) to charge properly. Thus, when charging from a first battery to a second battery, some embodiments will require an additional component (such as a DC-DC converter) between the two batteries to adjust the voltage being applied from the first battery to the second battery to ensure that the voltage applied to the second battery is within that battery's charging voltage range.

In some embodiments, method 300 may also determine an acceptable operating range for the electric vehicle's charging current. Method 300 may also consider other operating requirements, such as power allocation requirements among multiple vehicles and/or user-specified charging requirements.

Method 300 continues at 308 by consolidating at least a portion of the power signals received from the multiple solar cells into an output signal within the acceptable operating range (e.g., voltage and/or current operating ranges) for the type of electric vehicle requesting charging. The output signal is delivered to the electric vehicle at 310. Method 300 determines at 312 whether changes have occurred in the power signals received from the solar cells. For example, if a cloud temporarily blocks some of the sunlight reaching the solar cells, the voltage and/or current level of the power signals received from the solar cells may decrease. If changes are detected, method 300 makes necessary changes to the consolidation of the power signals to maintain the output signal within the acceptable operating range for the electric vehicle being charged. In some embodiments, method 300 determines if there are changes to a vehicle charging status or associated charging requirements that would necessitate a change in the output signal delivered to the electric vehicle.

As shown in FIG. 3, step 312 detects any changes to the power signals received from the solar cells. In alternate embodiments, step 312 may detect any type of change in the described systems, such as changes in vehicle charge requirements, connecting an additional electric vehicle, disconnecting an electric vehicle, and the like.

Figure 4:
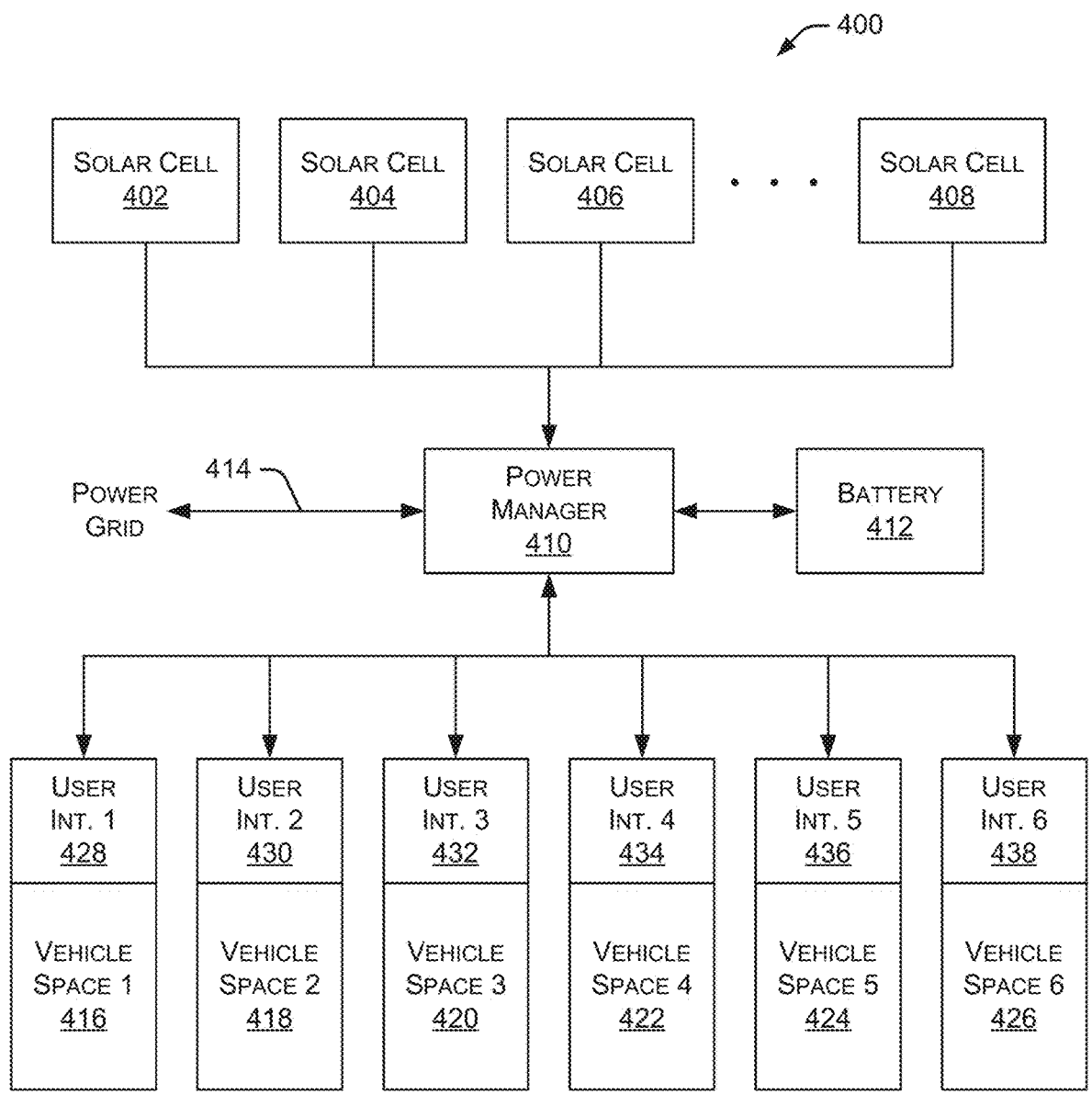
FIG. 4 is a block diagram depicting an embodiment of a charging location capable of charging multiple electric vehicles.

FIG. 4 is a block diagram depicting an embodiment of a charging location 400 capable of charging multiple electric vehicles. Charging location 400 includes multiple solar cells 402, 404, 406, and 408 coupled to a power manager 410. In some embodiments, solar cells 402-408 are similar to solar cells 102-108 discussed above with respect to FIG. 1. And, power manager 410 is similar to power manager 110 discussed above regarding FIG. 1 and FIG. 2. Power manager 410 is also coupled to a battery 412 and can receive power from a power grid source via connection 414. Battery 412 is also referred to as an "external battery" since it is external to (i.e., not contained within) an electric vehicle. Battery 412 is capable of storing power received from multiple sources, such as solar cells 402-408, power grid connection 414 or from one or more electric vehicles coupled to power manager 410. Additionally, battery 412 is capable of providing power to multiple sources, such as one or more electric vehicles coupled to power manager 410.

Charging location 400 also includes six vehicle spaces 416, 418, 420, 422, 424, and 426. Vehicle spaces 416-426 are also referred to as "parking spaces," and can be arranged in any configuration. Typically, vehicle spaces 416-426 are located adjacent to one another to simplify connection to, and management by, power manager 410. Each vehicle space 416-426 includes a user interface module 428, 430, 432, 434, 436, and 438, respectively. User interface modules 428-438 allow a user (e.g., a driver of an electric vehicle parked in one of the vehicle spaces 416-426) to interact with power manager 410. For example, users may login to an account, set vehicle charging parameters, pay for vehicle charging fees, and the like by interacting with the user interface module associated with the vehicle space within which the user's electric vehicle is parked. In particular examples, user interface modules 428-438 are implemented using one or more computing devices. These computing devices include a user interface that allows an individual to interact via a keyboard, screen, voice command, a mobile app, a scanning app that scans a bar code or other code, and the like. In some embodiments, users can interact with user interface modules 428-438 through a remote device (not shown in FIG. 4), such as a mobile device, a remote computing device or any other device capable of communicating with user interface modules 428-438.

In some embodiments, a single user interface module is provided for all vehicle spaces 416-426, such that all users of electric vehicles parked in vehicle spaces 416-426 use the same user interface module. For example, the single user interface module may be implemented as a kiosk located proximate to vehicle spaces 416-426.

Charging location 400 also includes a physical connector (not shown) to couple an electric vehicle in a vehicle space to power manager 410. For example, the physical connector may be an electrical connector that allows energy to flow from power manager 410 to the electric vehicle to charge one or more batteries contained in the electric vehicle. Additionally, the physical connector may allow the flow of electricity out of the electric vehicle's battery, such as when the electric vehicle's battery charge is being used to charge another electric vehicle or charge battery 412.

In a particular implementation, charging location 400 includes an overhead canopy that covers one or more of vehicle spaces 416-426. Solar cells 402-408 are located on the canopy. In a particular example, 44 to 50 solar panels are located on a canopy that covers six vehicle spaces. The canopy provides shade to the electric vehicles parked in the covered vehicle spaces and provides a platform to support the solar cells. Additionally, the canopy may include lights for illuminating the charging location 400 at night. These lights may be powered by the power grid or a battery that is charged during daylight hours by the solar cells. The electric vehicles being charged at charging location 400 may be charged serially or simultaneously.

Figure 5:
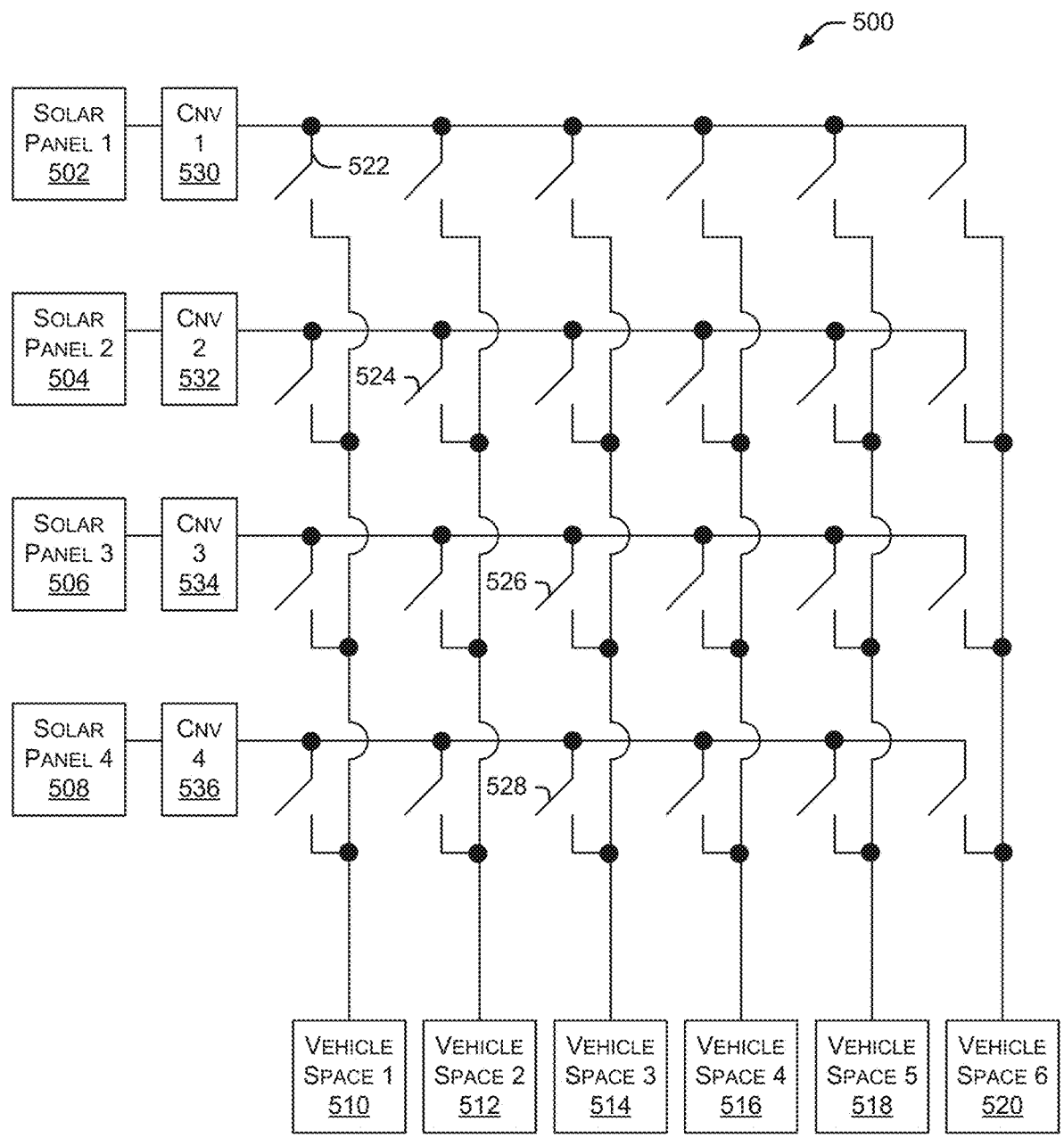
FIG. 5 is a block diagram depicting an embodiment of a switching system for connecting multiple solar panels to multiple electric vehicle spaces.

FIG. 5 is a block diagram depicting an embodiment of a switching system 500 for connecting multiple solar panels to multiple electric vehicle spaces. The embodiment of FIG. 5 includes four solar panels 502, 504, 506, and 508 in addition to four power converters 530, 532, 534, and 536. Each solar panel 502-508 may contain any number of solar cells arranged in any configuration. In alternate embodiments, a system may contain any number of solar panels and/or power converters. In some embodiments, the power converters perform functions similar to power manager 110 or output signal manager 208, discussed herein. In certain implementations, the power converters are DC-DC converters or inverters or a circuit that transmogrifies voltage to current, or current to voltage. Six vehicle spaces 510, 512, 514, 516, 518, and 520 can be coupled to any of the solar panels 502-508 by activating the appropriate switches. In some embodiments, the activation of the switches is controlled by power manager 110 or 410 to regulate the amount of power provided from solar panels 502-508.

In a specific example, three electric vehicles are located in vehicle spaces 510, 512, and 514. The vehicles are coupled to power manager 110 or 410, which can close switch 522 to provide power from solar panel 502 to the electric vehicle in vehicle space 510. Similarly, power manager 110 or 410 can close switch 524 to provide power from solar panel 504 to the electric vehicle in vehicle space 512. Finally, power manager 110 or 410 can close switches 526 and 528 to combine power from solar panels 506 and 508 to the electric vehicle in vehicle space 514.

In particular implementations, power manager 110 or 410 can control the distribution of power from a particular solar panel to multiple electric vehicles. For example, power manager 110 or 410 can allocate a certain percentage (e.g., 25%) of power from solar panels 502 through 508 to the electric vehicle in vehicle space 510 and allocate a different percentage (e.g., 75%) of power from solar panels 502 through 508 to the electric vehicle in vehicle space 520. In some embodiments, additional components such as DC-to-DC converters are used to isolate batteries in electric vehicles from one another and to ensure that voltages in different batteries are matched to properly deliver current from one electric vehicle to another. In particular implementations, the allocation of percentages from the solar panels to the multiple electric vehicles may change over time. For example, the 25/75 allocation mentioned above may occur during a first time period. The allocation is then changed (e.g., 50/50) during a second time period. This allocation is based on various factors, such as a charging priority associated with each electric vehicle, an amount paid by the user of the electric vehicle, the amount of charge needed by each electric vehicle, the time available to charge each electric vehicle, and the like.

In alternate embodiments, switching system 500 may include additional components to manage the distribution of power from the solar panels 502-508 to one or more electric vehicles in spaces 510-520. For example, additional power management components may be included in switching system 500 between the switches and the vehicle spaces 510-520. In some embodiments, the additional power management components convert voltage to current, or current to voltage, or convert one DC voltage to a different DC voltage through a DC-DC converter, or convert a DC voltage to an AC voltage through an inverter. The additional power management components may also provide safety functions, such as ground-fault detection.

In some embodiments, an inverter is put in line with the solar panels to deliver AC power to one or more electric vehicles (in vehicle spaces 510-520) through a Level 2 port. In other embodiments, power converters 530-536 may also use DC-DC converters, which would be useful if the system did not attain sufficient voltage or attained too high a voltage from the solar panels and it was necessary either to "step up" or "step down" the voltage from the solar panels to match the required electric vehicle battery voltage.

Figure 6:
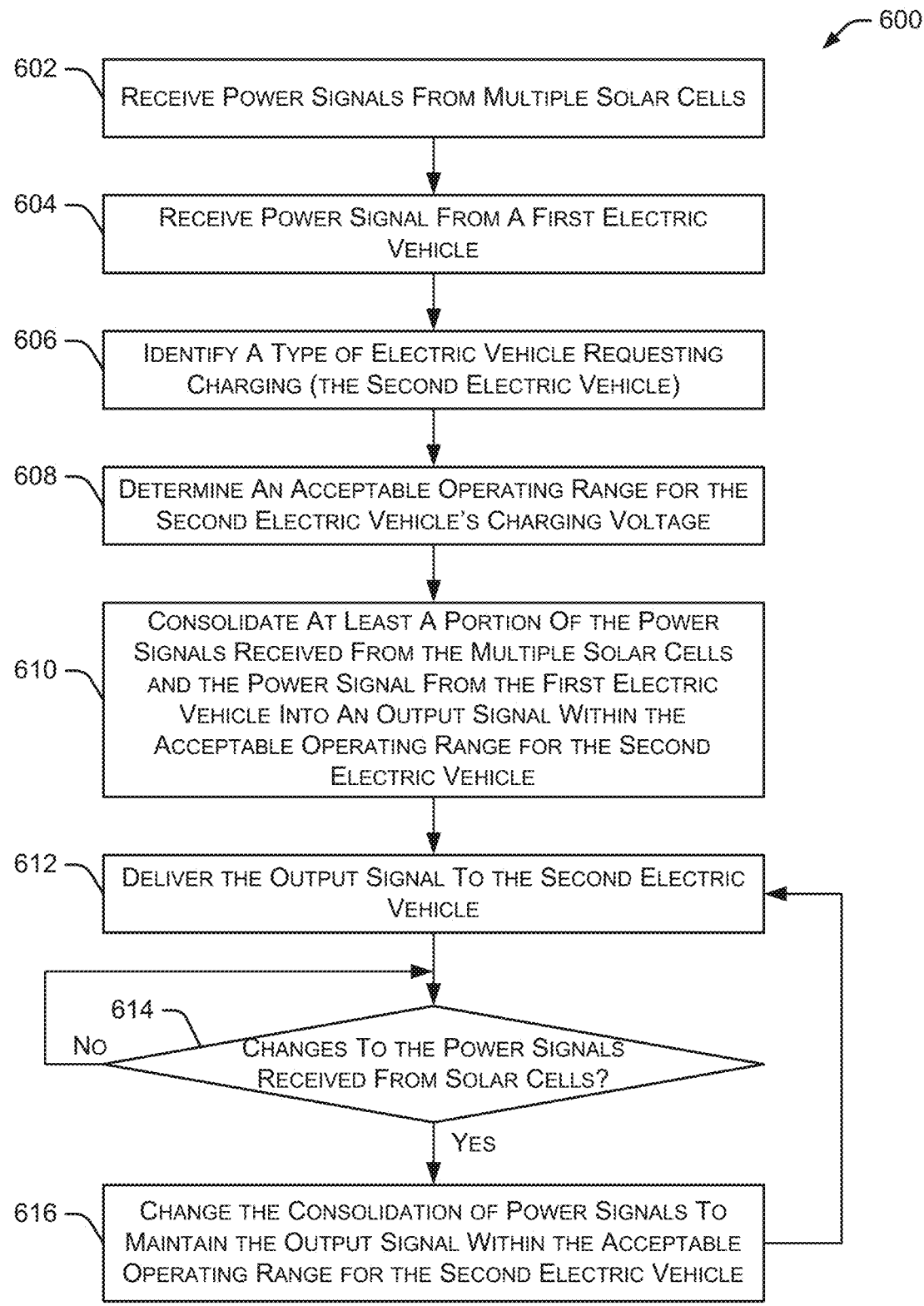
FIG. 6 is a flow diagram depicting an embodiment of a method for charging an electric vehicle using solar cells and power from another electric vehicle.

FIG. 6 is a flow diagram depicting an embodiment of a method 600 for charging an electric vehicle using solar cells and power from another electric vehicle. Method 600 is implemented, for example, within power manager 110 or 410. Initially, power signals are received from multiple solar cells at 602 and from a first electric vehicle at 604. Method 600 identifies a type of electric vehicle requesting charging at 606 (referred to as the "second electric vehicle") and determines an acceptable operating range for the second electric vehicle's charging voltage at 608. In some embodiments, method 600 also determines an acceptable operating range for the second electric vehicle's charging current. Method 600 may also consider other operating requirements, such as power allocation requirements among multiple vehicles or user-specified charging requirements.

Method 600 continues at 610 by consolidating at least a portion of the power signals received from the multiple solar cells and the power signal received from the first electric vehicle into an output signal within the acceptable operating range (e.g., voltage and/or current operating ranges) for the second electric vehicle.

When consolidating power signals from multiple sources, the consolidation process will vary depending on the power resources and the number of vehicles being charged. For example, if a single electric vehicle is present, the power manager can consolidate all power signals to that single electric vehicle. If another electric vehicle is present, the power manager can allocate the power signals among the multiple electric vehicles based on driver preferences, charging needs of each vehicle, and the like. In some embodiments, the power signals are consolidated by connecting different strings of solar panels to different electric vehicles. Each string of solar panels can deliver a different IV curve. For example, if one electric vehicle needs a slow charge, one string of solar panels is connected to that electric vehicle. If another electric vehicle needs a faster charge, two strings of solar panels may be combined such that the output from those two strings of solar panels is provided to the second electric vehicle. The IV curve will "settle" to the battery voltage being requested by the electric vehicle being charged.

The output signal is delivered to the second electric vehicle at 612. Method 600 determines at 614 whether changes have occurred in the power signals received from the solar cells. For example, if a cloud temporarily blocks some of the sunlight reaching the solar cells, the voltage and/or current level of the power signals received from the solar cells may decrease. If changes are detected, method 600 makes necessary changes to the consolidation of the power signals to maintain the output signal within the acceptable operating range for the second electric vehicle at 616. In some embodiments, method 600 determines if there are changes to a vehicle charging status or associated charging requirements that would necessitate a change in the output signal delivered to the second electric vehicle.

Figure 7:
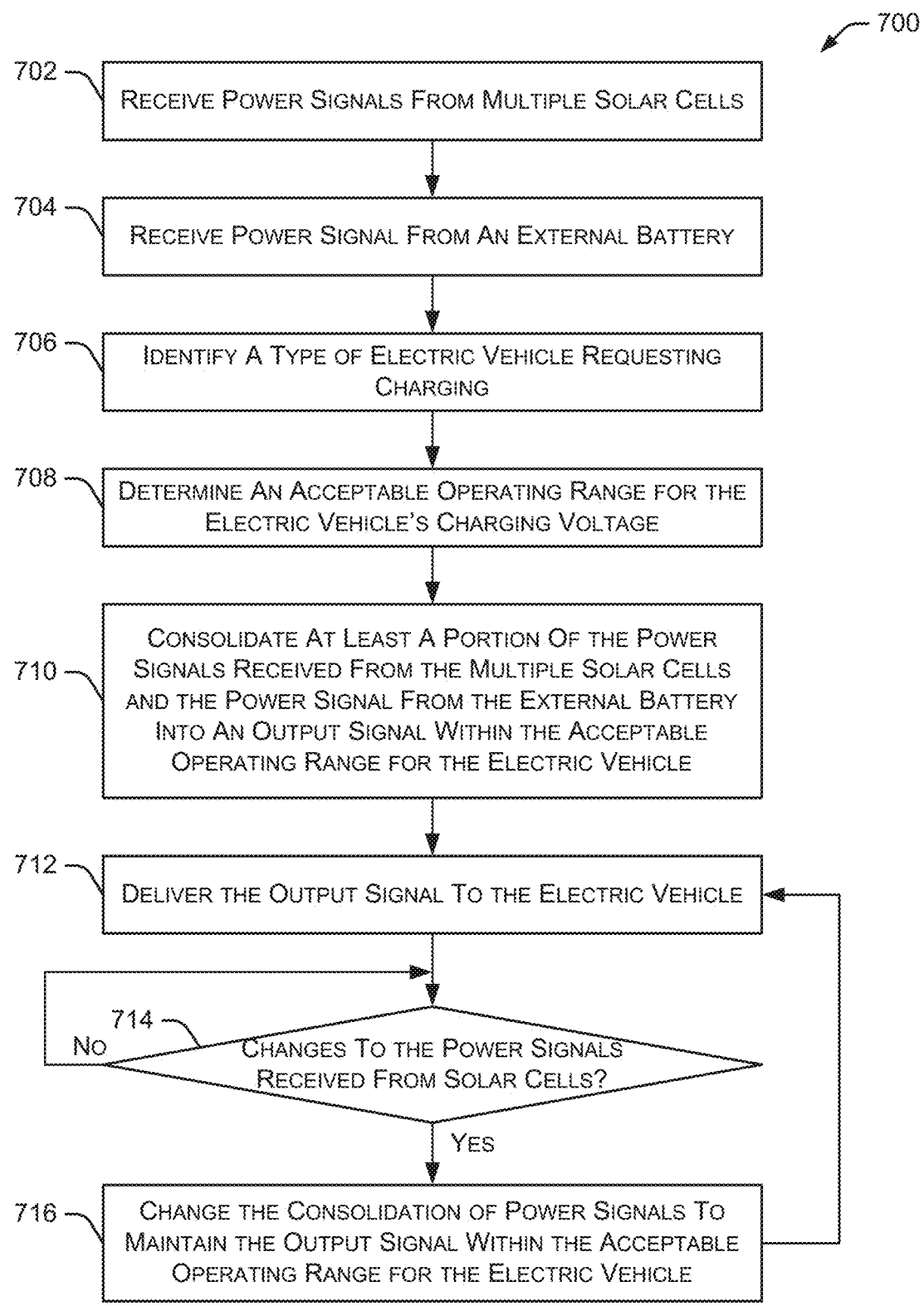
FIG. 7 is a flow diagram depicting an embodiment of a method for charging an electric vehicle using solar cells and an external battery.

FIG. 7 is a flow diagram depicting an embodiment of a method 700 for charging an electric vehicle using solar cells and an external battery. In some embodiments, method 700 is implemented within power manager 110 or 410. Initially, power signals are received from multiple solar cells at 702 and from an external battery at 704. Method 700 identifies a type of electric vehicle requesting charging at 706 and determines an acceptable operating range for the electric vehicle's charging voltage at 708. In some embodiments, method 700 also determines an acceptable operating range for the electric vehicle's charging current. Method 700 may also consider other operating requirements, such as power allocation requirements among multiple vehicles or user-specified charging requirements.

Method 700 continues at 710 by consolidating at least a portion of the power signals received from the multiple solar cells and the power signal received from the external battery into an output signal within the acceptable operating range (e.g., voltage and/or current operating ranges) for the electric vehicle. In some embodiments, when consolidating power from solar panels with power from a battery, an additional component (e.g., a DC-DC converter) may be needed at the battery to adjust the voltage to the proper voltage (or voltage range) requested by the electric vehicle being charged. The voltage of the solar panels will adjust automatically by following its IV curve to the voltage (or voltage range) requested by the electric vehicle being charged. The output signal is delivered to the electric vehicle at 712. Method 700 determines at 714 whether changes have occurred in the power signals received from the solar cells. As mentioned above, if a cloud temporarily blocks some of the sunlight reaching the solar cells, the voltage and/or current level of the power signals received from the solar cells may decrease. If changes are detected, method 700 makes necessary changes to the consolidation of the power signals to maintain the output signal within the acceptable operating range for the electric vehicle at 716. In some embodiments, method 700 determines if there are changes to a vehicle charging status or associated charging requirements that would necessitate a change in the output signal delivered to the electric vehicle.

Figure 8:
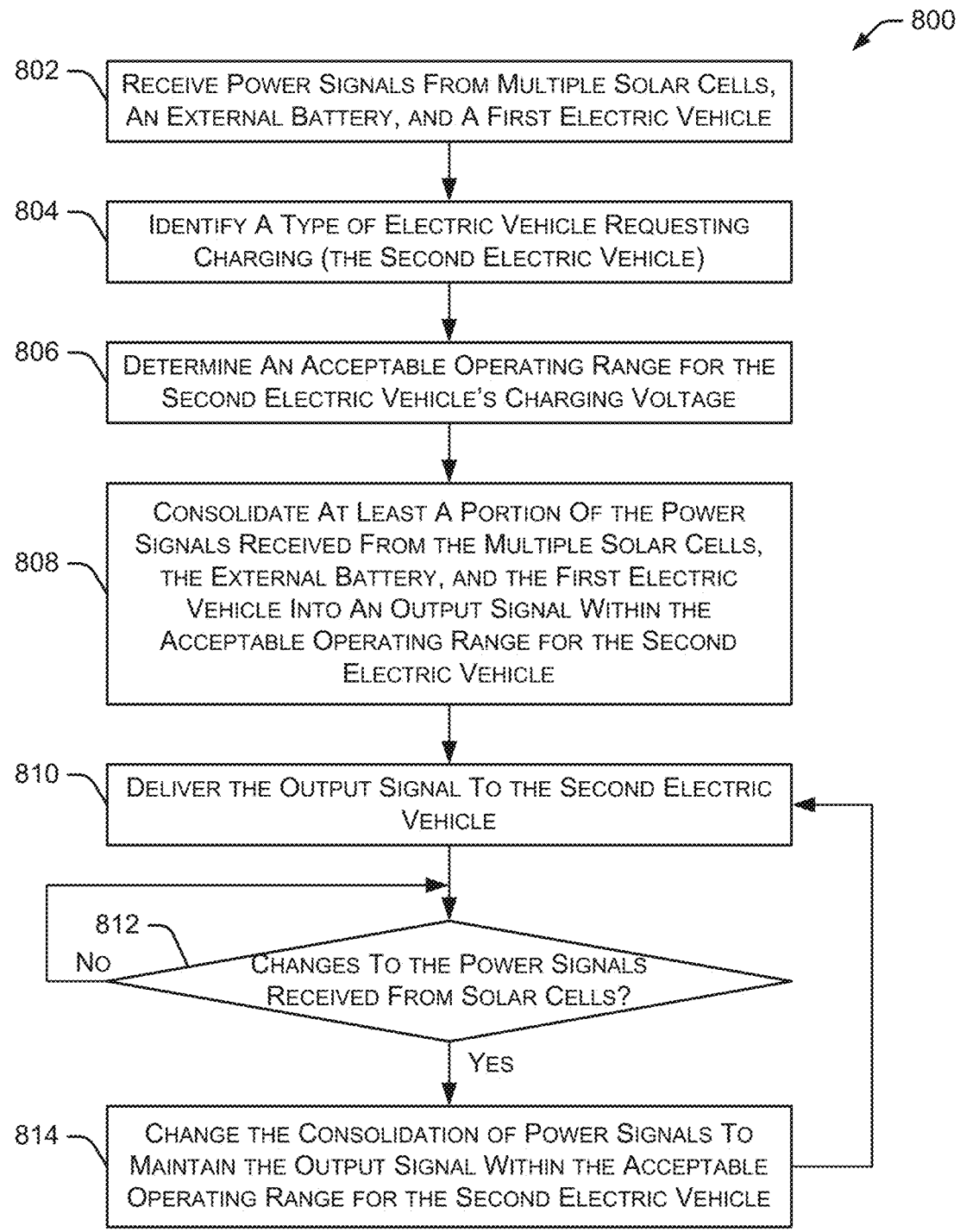
FIG. 8 is a flow diagram depicting an embodiment of a method for charging an electric vehicle using solar cells, an external battery, and power from another electric vehicle.

FIG. 8 is a flow diagram depicting an embodiment of a method 800 for charging an electric vehicle using solar cells, an external battery, and power from another electric vehicle. In some implementations, method 800 is implemented within power manager 110 or 410. Initially, power signals are received from multiple solar cells, an external battery, and a first electric vehicle at 802. Method 800 identifies a type of electric vehicle requesting charging at 804 (referred to as the "second electric vehicle"), and determines an acceptable operating range for the second electric vehicle's charging voltage at 806. In some embodiments, method 800 also determines an acceptable operating range for the second electric vehicle's charging current. Method 800 may further consider other operating requirements, such as power allocation requirements among multiple vehicles or user-specified charging requirements.

Method 800 continues at 808 by consolidating at least a portion of the power signals received from the multiple solar cells, the external battery, and the first electric vehicle into an output signal within the acceptable operating range (e.g., voltage and/or current operating ranges) for the second electric vehicle. The output signal is delivered to the electric vehicle at 810. Method 800 determines at 812 whether changes have occurred in the power signals received from the solar cells. As previously mentioned, if a cloud temporarily blocks some of the sunlight reaching the solar cells, the voltage and/or current level of the power signals received from the solar cells may decrease. If changes are detected, method 800 makes necessary changes to the consolidation of the power signals to maintain the output signal within the acceptable operating range for the second electric vehicle at 814. In some embodiments, method 800 also determines if there are changes to a vehicle charging status or associated charging requirements that would necessitate a change in the output signal delivered to the electric vehicle.

Figure 9:
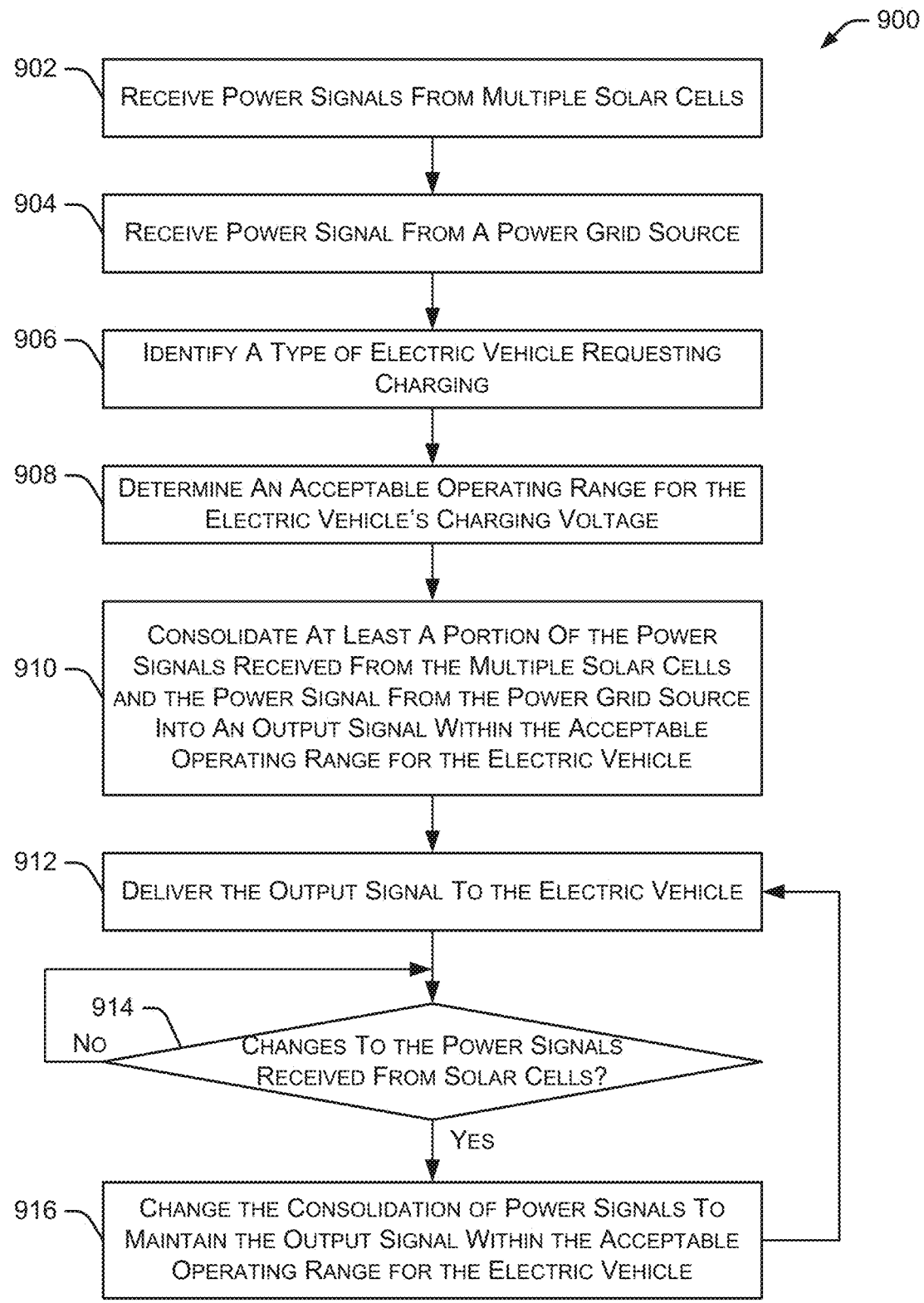
FIG. 9 is a flow diagram depicting an embodiment of a method for charging an electric vehicle using solar cells and a power grid source.

FIG. 9 is a flow diagram depicting an embodiment of a method 900 for charging an electric vehicle using solar cells and a power grid source. In some embodiments, method 900 is implemented within power manager 110 or 410. Initially, power signals are received from multiple solar cells at 902 and from a power grid source at 904. Method 900 identifies a type of electric vehicle requesting charging at 906 and determines an acceptable operating range for the electric vehicle's charging voltage at 908. In some embodiments, method 900 also determines an acceptable operating range for the electric vehicle's charging current. Method 900 may further consider other operating requirements, such as power allocation requirements among multiple vehicles or user-specified charging requirements.

Method 900 continues at 910 by consolidating at least a portion of the power signals received from the multiple solar cells and the power signal received from the power grid source into an output signal within the acceptable operating range (e.g., voltage and/or current operating ranges) for the electric vehicle. In some embodiments, a rectifier is used to convert AC power from the grid to a DC power signal. A specific embodiment steps up the voltage from the grid (e.g., from 208 volts to 350-400 volts) and uses a rectifier to convert from AC to DC. In some embodiments, the power from the solar cells is inverted into AC power (using an inverter) that is delivered through the Level 2 port to the electric vehicle. This AC power can be combined with power from the grid or from a rectifier by adding the two power signals through one or more circuit breakers. When charging through the Level 2 port, the charger on the electric vehicle converts the AC signal back into DC and delivers the DC power to the battery in the electric vehicle. In this situation, the charger in the electric vehicle handles the matching required to meet the charging needs of the electric vehicle's battery.

The output signal is delivered to the electric vehicle at 912. Method 900 determines at 914 whether changes have occurred in the power signals received from the solar cells. As mentioned above, if a cloud temporarily blocks some of the sunlight reaching the solar cells, the voltage and/or current level of the power signals received from the solar cells may decrease. If changes are detected, method 900 makes necessary changes to the consolidation of the power signals to maintain the output signal within the acceptable operating range for the electric vehicle at 916. In some embodiments, method 900 determines if there are changes to a vehicle charging status or associated charging requirements that would necessitate a change in the output signal delivered to the electric vehicle.

The method of FIG. 9 can reduce overall operating costs by anticipating demand charges associated with power from the grid. When a demand spike occurs, the described systems and methods can adjust the power consolidation to use more power from the solar cells (or use exclusively solar power), thereby using less power from the grid. When the demand spike ends, the systems and methods can receive more power from the grid, having avoided the more costly demand spike.

Figure 10:
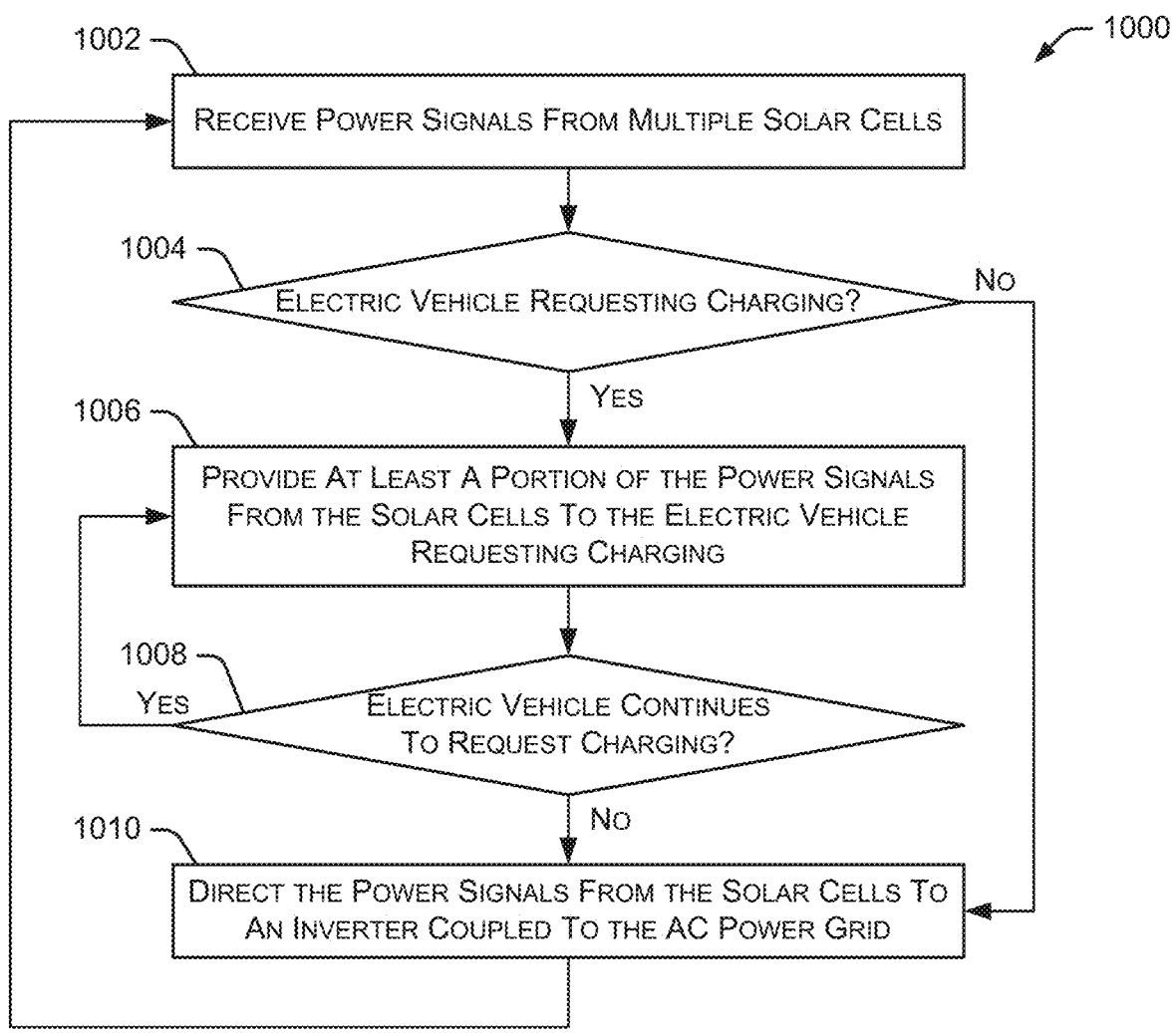
FIG. 10 is a flow diagram depicting an embodiment of a method for switching power signals from solar cells between an electric vehicle and a power grid.

FIG. 10 is a flow diagram depicting an embodiment of a method 1000 for switching power signals from solar cells between an electric vehicle and a power grid. In some embodiments, method 1000 is implemented within power manager 110 or 410. Initially, power signals are received from multiple solar cells at 1002. Method 1000 determines whether an electric vehicle is requesting charging at 1004. If so, the method provides at least a portion of the power signals from the solar cells to the electric vehicle requesting charging at 1006. As long as the electric vehicle continues to request charging at 1008, at least a portion of the power signals from the solar cells are provided to the electric vehicle. When the electric vehicle no longer requests charging, method 1000 directs some or all of the power signals from the solar cells to an inverter coupled to the AC power grid at 1010. The power from the solar cells is directed to the inverter until an electric vehicle requests charging.

In particular embodiments, the described systems and methods can operate as an AC grid connected resource. For example, the systems and methods described herein can be configured to sell power back to the grid when the solar cells are creating more power than is presently needed to charge electric vehicles. If no electric vehicles need the solar power (or do not need all of the power generated by the solar cells), the unused solar panel strings can be connected to an inverter, which delivers the excess power to the grid. This is particularly useful, for example, on weekends or holidays at an office location when few electric vehicles are present. Providing the excess power to the grid helps offset the costs associated with building and managing the described systems and methods. This embodiment can be implemented using an inverter coupled to the grid. Furthermore, the inverter could be capable of delivering a 240 VAC power signal to an electric vehicle through its Level 2 charging port when the system is not connected to the grid. When the electric vehicle is finished charging, and no other electric vehicles need charging, the system reconnects to the grid.

In some embodiments, the described systems and methods can charge one or more electric vehicles while simultaneously selling some of the power generated by the solar cells back to the grid. For example, if there are four strings of solar cells, but only two of the strings are presently used to charge electric vehicles, the output power from the other two solar cells can be connected to an inverter that is selling the power back into the grid and/or reducing onsite customer load on the grid.

Figure 11:
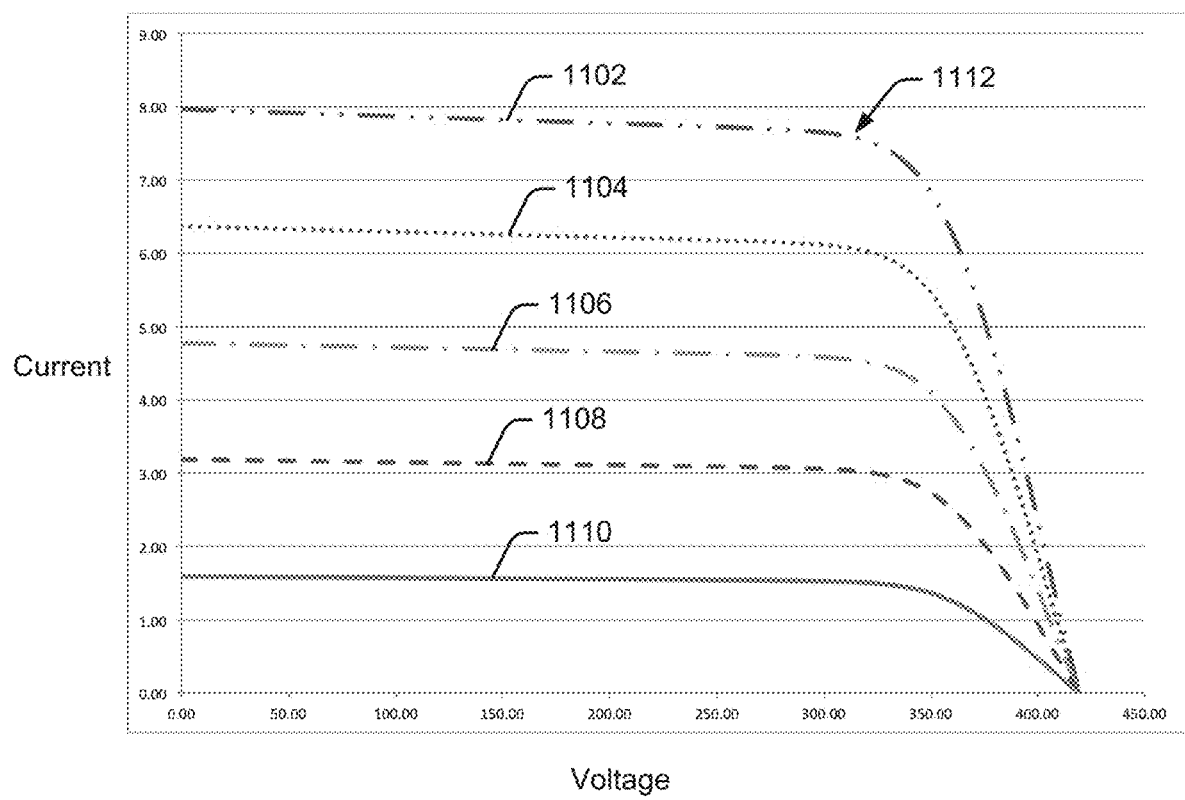
FIG. 11 is an example depiction of multiple IV curves at different levels of irradiance.

FIG. 11 is an example depiction of multiple IV curves at different levels of irradiance. The vertical scale in FIG. 11 indicates changes in current based on changes in light intensity. The horizontal scale in FIG. 11 indicates changes in voltage based on ambient temperature changes. Line 1102 shows the IV curve at an irradiance of 1000 W/m², line 1104 shows the IV curve at an irradiance of 800 W/m², line 1106 shows the IV curve at an irradiance of 600 W/m², line 1108 shows the IV curve at an irradiance of 400 W/m², and line 1110 shows the IV curve at an irradiance of 200 W/m². The IV curves shown in FIG. 11 are based on an air mass of 1.5 and a solar cell temperature of 25 degrees Celsius. The air mass coefficient defines the direct optical path length through the Earth's atmosphere, and is a ratio of the optical path length compared to the path length vertically upwards. An air mass of 1.5 represents the longer path length the sun's rays travel through the atmosphere in the Northern Hemisphere where the rays are oblique to the surface (as compared to unity if they are perpendicular to the surface).

As shown in FIG. 11, an apex 1102 of the IV curves is the maximum power point (MPP) of the IV curve (where the product of the current, I, times the voltage, V, is equal to the largest power, P). In some embodiments, the voltage provided by one or more solar cells varies with temperature, but is typically within the range of 350-400 volts at typical temperature ranges in moderate climates. When the solar cells are connected to an electric vehicle, the battery in the electric vehicle determines the voltage so that the battery voltage and the solar cell voltage are close to one another. As discussed above, the voltage of the solar panels will adjust automatically to the voltage (or voltage range) requested by the electric vehicle being charged by moving to a point on the IV curves where the two voltages match. When charging from one battery to another, since batteries do not have IV curves, an additional component (e.g., control logic and/or power module) is used to adjust/match voltages between the two batteries.

After an electric vehicle is connected to the solar cells, the solar cells will drift up and down the IV curve shown in FIG. 11 to match the voltage of the battery in the electric vehicle. This drift will cause the solar cells to move out of the MPP of the IV curve to maintain the voltage match. The described system allows the solar cells to charge an electric vehicle's battery without any additional power components.

Figure 12A:
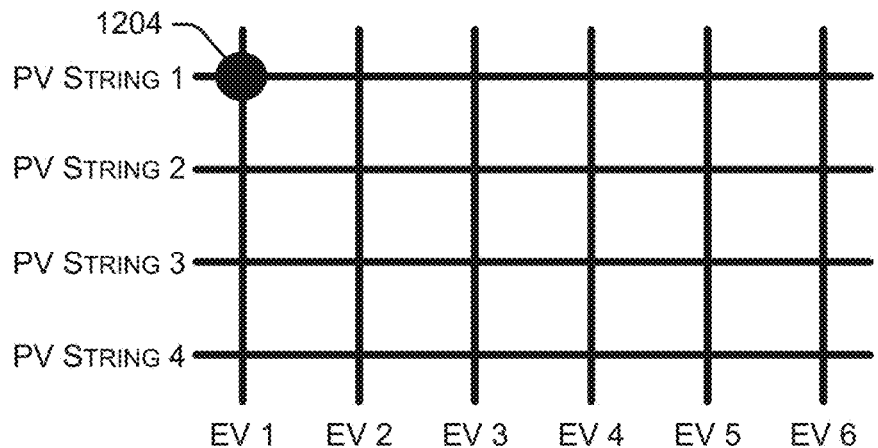
FIGS. 12A-12C illustrate example depictions of a switching matrix capable of connecting multiple solar cells to multiple electric vehicles.
Figure 12B:
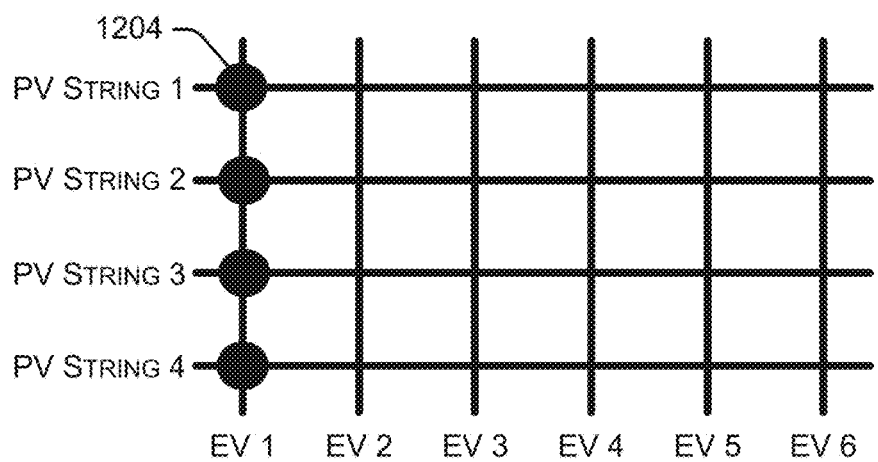
Figure 12C:
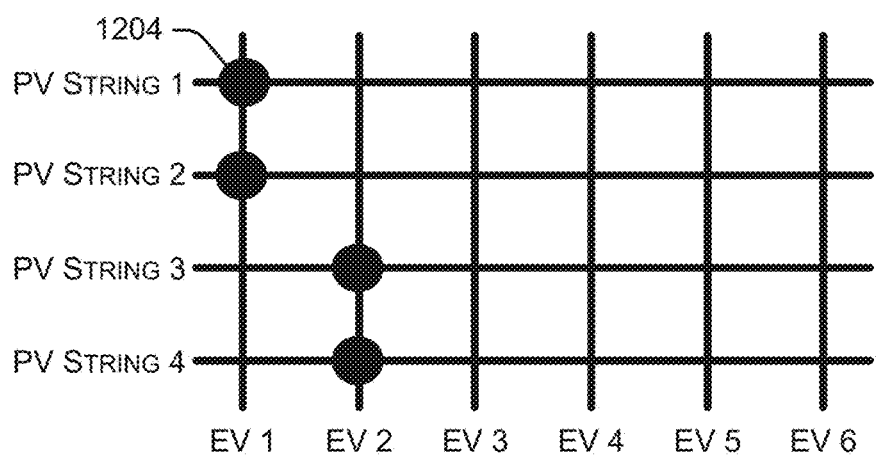

In some embodiments, multiple photovoltaic strings (also referred to as solar cells or solar cell strings) may be configured to charge multiple electric vehicles. As used herein, a photovoltaic string is a set of solar cells or solar modules connected together in a series electrical string. For example, FIGS. 12A-12C illustrate example depictions of a switching matrix 1202 capable of connecting multiple photovoltaic (PV) strings to multiple electric vehicles (EV). The example switching matrix 1202 shows four PV strings capable of being connected to six electric vehicles. In alternate embodiments, any number of PV strings can be provided to connect with any number of electric vehicles.

In the example of FIGS. 12A-12C, switching matrix 1202 has 24 individual positions (i.e., 24 points where a PV string line intersects an EV line) such that any PV string can be connected to charge any EV. In the example switching matrix 1202, each circle 1204 indicates that the particular intersection is "on" (or active). Intersections without a circle are "off" (or inactive). For example, in FIG. 12A, PV String 1 is connected to EV 1 such that the energy from PV String 1 charges EV 1 (e.g., charges one or more batteries in EV 1). In the example of FIG. 12B, all four PV strings are connected to EV 1. In the example of FIG. 12C, PV String 1 and PV String 2 are connected to EV 1, while PV String 3 and PV String 4 are connected to EV 2.

When one or more PV strings are connected to a particular EV, that EV is being charged by that portion of the solar array. This configuration helps control the current provided to each EV from the PV strings. For example, if each PV string generates 5 A (amps) under normal light conditions, activating one PV string will provide 5 A to the EV. If two PV strings are activated, 10 A are provided to the EV, and so forth. In some embodiments, if multiple PV strings are to be activated for a particular vehicle, all PV strings are not activated at the same time. For example, if EV 1 is to receive 20 A (as shown in FIG. 12B), a first PV string is activated and, after a particular period of time, a second PV string is activated, followed by another period of time, activation of a third PV string, another period of time, and finally the fourth PV string is activated. A similar process is followed when reducing the number of PV strings connected to an EV (e.g., deactivating one PV string and waiting a period of time before deactivating the next PV string).

In some embodiments, certain PV strings may be given priority over other PV strings. For example, if one PV string faces east and another PV string faces west, the east-facing PV string may be given priority in the morning (since it is receiving greater sunlight) and the west-facing PV string may be given priority in the afternoon. In particular implementations, different PV strings may generate different current levels. In these situations, multiple PV strings are selected to provide a requested current level to a specific electric vehicle. For example, a particular system has four PV strings that generate 5 A, 5 A, 3 A, and 1 A. If an electric vehicle requests 8 A, the system will adjust the switches to select a 5 A string and the 3 A string to provide 8 A to the electric vehicle.

The example of FIG. 12C shows multiple vehicles being charged simultaneously. In this example, half of the solar array (two PV strings) is connected to EV 1 and the other half of the solar array (the other two PV strings) is connected to EV 2. Since there are only two electric vehicles being charged, the power from the solar array is split between the two electric vehicles. In other situations, if four electric vehicles need charging, each vehicle may receive power from each one of the PV strings. If three electric vehicles are present for charging, one vehicle may receive power from two PV strings and the other two vehicles receive power from one of the two other PV strings.

In some embodiments, a "round robin" approach is used to charge multiple vehicles. For example, in FIG. 12B, EV 1 is receiving all power from the solar array. After a period of time, the switches for EV 1 are turned off and the switches for EV 2 are turned on, thereby transferring the power from the solar array from EV 1 to EV 2. After another period of time, the switches for EV 2 are turned off and the switches for EV 3 are turned on, thereby transferring the power from the solar array from EV 2 to EV 3. And, after another period of time, the switches for EV 3 are turned off and the switches for EV 4 are turned on, thereby transferring the power from the solar array from EV 3 to EV 4. After another period of time, the power may be transferred back to EV 1. This "round robin" technique is particularly useful when there are more electric vehicles present than there are available PV strings. As vehicles become fully charged, they are removed from the "round robin" process, and as new vehicles arrive and request charging, they may be added to the process. This technique allows all electric vehicles to receive a portion of the power generated by the solar array over time.

In some embodiments, a "round robin" technique gives the electric vehicles that are charging one PV string at a time. For example, if there are six electric vehicles charging, during a first time period, PV String 1 goes to EV 1, PV String 2 goes to EV 2, PV String 3 goes to EV 3, and PV String 4 goes to EV 4. During a second time period, EV 1 is deactivated and the power from PV String 1 is provided to EV 5. During a third time period, EV 2 is deactivated and the power from PV String 2 is provided to EV 6, and so forth.

In some embodiments, an electric vehicle may request that a particular current level be provided from the PV string(s) during the charging process. In this situation, the charging system needs to provide the requested current to the electric vehicle. When dealing with a solar array, the current may vary depending on the amount of light collected by the solar array. When the current level varies, the systems and methods described herein may "fool" the electric vehicle into thinking it is actually receiving the desired current (even though it may be receiving less than the requested current).

In some embodiments, the maximum output power of a particular charger may be adjusted dynamically, which enables better power management (especially when there are multiple chargers in simultaneous use at a particular location). In particular implementations of traditional utility grid connected chargers, there may be multiple chargers at a charging location, but the capacity of the grid is limited. When a first electric vehicle arrives at the charging location, it can receive all of the available power. When a second electric vehicle arrives at the charging location, it has to wait for the first vehicle to finish charging, or the second vehicle can take some of the power away from the first vehicle. With the approach of the chargers discussed herein, when the charging location generates power from one or more solar arrays, the charging systems must account for intermittent light conditions. Thus, the amount of power that can be delivered to one or more electric vehicles varies depending on the intensity of the sunlight on the solar array. In this situation, the described systems and methods dynamically adjust the size of the charger to match the power presently being delivered from the solar array.

In some embodiments, the charging system is designed to "offer" more power to the electric vehicles than it is actually capable of providing. When charging an electric vehicle, it is important that the electric vehicle not request more power than the charger is capable of delivering, otherwise the charging session may be terminated. Additionally, the charger should not deliver more power than the electric vehicle has requested—this could also result in an error and termination of the charging session. Further, if the difference between the "advertised power" from the charger and what the charger actually delivers gets too large, the electric vehicle may terminate the charging session. Thus, it is important for the charger to maintain and advertise appropriate power levels to ensure proper charging of the electric vehicles.

When switching PV strings on and off, it may not be possible to determine how much current a particular PV string will deliver. In some embodiments, before turning on a PV string, the systems and methods advertise a current that is at least as large as the maximum current from the PV string. The systems and methods then wait for an electric vehicle to request current that exceeds a "safe" threshold at which point the PV string is turned on. For example, the difference between the electric vehicle's requested current and the maximum current that the PV string can deliver needs to be less than the error threshold for the electric vehicle. In other words, a "safe" threshold is a current request from the electric vehicle that allows the PV string to be switched on without triggering an error condition due to the differences between the actual current, the advertised current, and the electric vehicle's requested current. In a particular example of a safe threshold, a PV string can deliver up to 10A, but based on the sun's current position, that PV string can only deliver 7 A. In this example, no other PV strings are active. The charger advertises that it can deliver the full 10 A, then waits for an electric vehicle to request at least 9 A, which is considered a safe value in this example. Once the PV string is turned on, the current is measured to be 7 A, the charger changes its advertised value to 8 A, and the electric vehicle's request adjusts accordingly.

The following represents an unsafe threshold. In the previous example, assume that the PV string is turned on once the electric vehicle has requested 5 A. The PV string is then turned on with an actual current of 7 A, which is greater than the 5 A requested by the electric vehicle. Providing 7 A to the electric vehicle when it only requested 5 A will trigger an error.

When the PV string is turned on, the actual current is known and the advertised current is quickly adjusted to the actual current value. If the systems and methods wait too long and advertise the higher value without delivering the matching current, the electric vehicle may trigger an error and stop the charging session.

In some situations, an electric vehicle may decrease its current request as the battery approaches a maximum charge. In these situations, the systems and methods monitor the current request from the electric vehicle relative to the actual current being provided to the electric vehicle. If the current request from the electric vehicle is less than the measured value, the systems and methods turn off one or more PV strings to keep the measured value close to the current request, thereby avoiding a situation where the electric vehicle stops the charging session (because the current provided to the electric vehicle exceeds the requested current).

As discussed above, an electric vehicle may request a particular current level, but the described systems and methods do not always provide the requested current level. And, in some embodiments, the systems and methods may not provide any current during particular periods of time. The purpose of this "no charging" time period is to accommodate the "round robin" process discussed above. Additionally, this approach is also useful when an electric vehicle is plugged in early in the morning (before any sunlight is contacting the solar array)—it keeps the charging session running until sunlight is available. The approach is also helpful on cloudy days when there may be periods when the solar array is not generating sufficient power. The described approach keeps the charging session active. In some situations, if the charging session ends, the electric vehicle must be unplugged and reconnected by a user before vehicle charging can resume. Thus, keeping the charging session active avoids this inconvenient situation for the user.

If there are more electric vehicles requesting charging than there are available PV strings, some vehicles will not be charged during certain time periods. For example, if there are six electric vehicles that need charging, but only four available PV strings, there will always be at least two vehicles that are not being charged (e.g., not receiving any current) during certain time periods. When the round robin process advances, one or both of those electric vehicles will begin to receive current and one or more other vehicles will stop receiving current.

As mentioned above, in some embodiments, the systems and methods may "fool" the electric vehicle into thinking it is actually receiving the desired current (even though it may not be receiving any current for a period of time). This is important when charging electric vehicles in a "round robin" manner and some of the vehicles are not charged periodically because there are more vehicles being charged than the number of available PV strings. When a vehicle being "fooled" is allocated a PV string, the systems and methods advertise the full capacity of the PV string before actually turning it on.

In some embodiments, one or more electric vehicles, such as farm or agricultural vehicles, may be charged using energy generated from any number of solar cells. In many farm or agricultural environments, traditional power grid connections may be a significant distance from the area being farmed. For example, the existing power grid may include power lines along major roads, but a significant distance away from farmed areas. In other examples, the power grid in farming or agricultural areas may be inadequate to charge heavy vehicles, such as tractors or trucks. In some situations, farms and agricultural areas may be located near the end of utility distribution lines. In these situations, the distribution line conductors may be undersized and unable to support the addition of heavy grid loads, such as the electric vehicle charging of heavy vehicles, such as farm and agricultural equipment.

Traditional farm and agricultural equipment that runs on gasoline or diesel fuel does not typically need access to the power grid when working in a farm or agricultural environment. However, electric farm and agricultural vehicles need a system for recharging their batteries at regular intervals. In the described embodiments, a vehicle charging station using multiple solar cells can be positioned anywhere in a farm or agricultural environment regardless of the proximity of power from the power grid or the power and energy capacities of the available grid connection.

Figure 13:
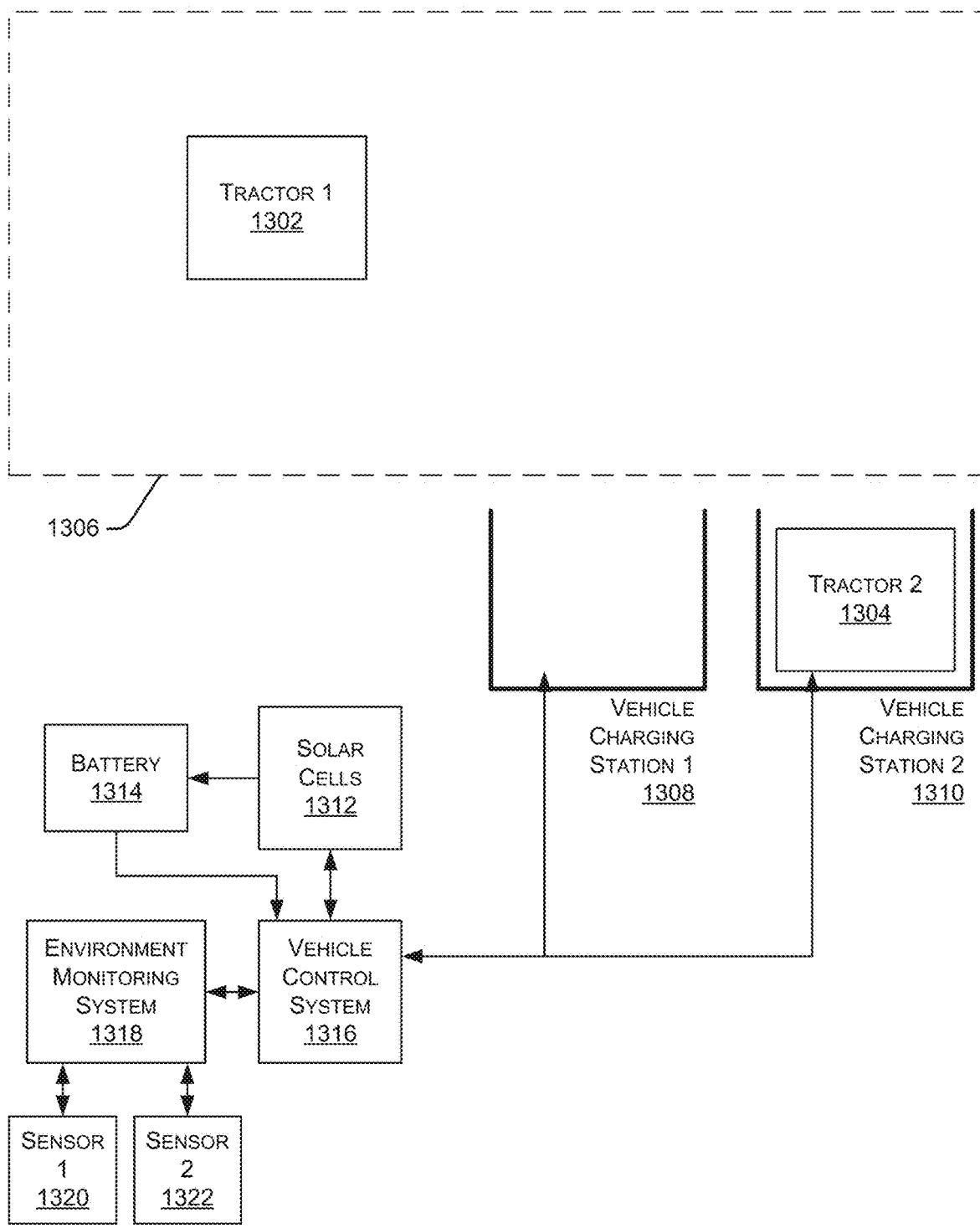
FIG. 13 illustrates an environment in which particular embodiments may be implemented.

FIG. 13 illustrates an environment in which particular embodiments may be implemented. As shown in FIG. 13, an example farm or agricultural environment is illustrated with a farming area 1306, a first tractor 1302, and a second tractor 1304. Although the example of FIG. 13 shows two tractors, alternate embodiments may include any number of tractors operating in farming area 1306. In this example, tractors are shown for purposes of illustration. In other embodiments, any type of vehicle, farm equipment, farm machinery, truck, and the like may utilize the various aspects of the systems and methods described herein.

In the described embodiment, first tractor 1302 and second tractor 1304 are electric tractors that include one or more batteries that need to be recharged at regular intervals. The systems and methods described herein provide a mechanism for recharging electric tractors or other electric vehicles operating in farming area 1306. In some embodiments, farming area 1306 represents area in which either tractor 1302, 1304 may operate. In some situations, tractors 1302, 1304 are restricted to operating within farming area 1306. In other situations, tractors 1302, 1304 may operate outside farming area 1306.

As shown in FIG. 13, two vehicle charging stations 1308 and 1310 are located adjacent to (or within) farming area 1306. Although two vehicle charging stations 1308 and 1310 are shown, alternate embodiments may include any number of vehicle charging stations. For example, a large farming area 1306 with many tractors and other vehicles may require more than two vehicle charging stations to keep the tractors and other vehicles charged and operating.

In some embodiments, vehicle charging stations 1308, 1310 may be located anywhere that is accessible by tractors 1302, 1304. In some implementations, vehicle charging stations 1308, 1310 are positioned in areas that are not typically farmed, such as areas prone to flooding, areas that are not practical for farming or growing crops, and the like.

In some embodiments, vehicle charging stations 1308 and 1310 each provide one or more connections for tractors 1302 and 1304 to recharge their batteries. In particular implementations, vehicle charging stations 1308, 1310 may be any type of structure or area where tractors 1302, 1304 can connect with a charging port or other connection device to charge one or more batteries in the tractor.

Since the environment of FIG. 13 includes two vehicle charging stations 1308, 1310, both tractors 1302, 1304 may be charged simultaneously if solar cells 1312 are generating enough energy. For example, on a sunny day, solar cells 1312 may generate sufficient energy to charge batteries in both tractors 1302, 1304 at the same time. However, on a cloudy day, solar cells 1312 may only generate enough energy to charge one battery (e.g., the battery in tractor 1302 or 1304). The systems and methods discussed herein determine how to charge one or both tractors 1302, 1304 based on current sunlight levels and other environmental factors. The energy generated by solar cells 1312 may be referred to as "power" or as a "power signal" herein.

As shown in FIG. 13, multiple solar cells 1312 are coupled to one or more batteries 1314, which may store energy generated by solar cells 1312. A vehicle control system 1316 is coupled to solar cells 1312 and an environment monitoring system 1318. In the example of FIG. 13, the energy generated by solar cells 1312 can be stored in batteries 1314 or directed (by vehicle control system 1316) to vehicle charging station 1308 and/or vehicle charging station 1310. Additionally, energy stored in batteries 1314 can be directed by vehicle control system 1316 to vehicle charging station 1308 and/or vehicle charging station 1310.

In some embodiments, environment monitoring system 1318 is coupled to two sensors 1320 and 1322. In other embodiments, environment monitoring system 1318 may be coupled to any number of sensors. Sensors 1320 and 1322 may be environmental sensors, such as sunlight intensity sensors, temperature sensors, rain sensors, wind sensors, and the like. These environmental sensors can be used by vehicle control system 1316 to predict the current and voltage generated by solar cells 1312 based on the present environmental conditions. The current and voltage predictions may be used to predict the energy generated by solar cells 1312 that is available to charge, for example, tractors 1302, 1304.

In some embodiments, one or more of sensors 1320, 1322 can be replaced by virtual sensors or other sources of environmental or weather data. For example, one or more internet-based services or data sources may provide data regarding one or more of: current temperature, sunlight intensity, rain activity, wind speed and direction, and the like in a region proximate farming area 1306. Additionally, internet-based services may provide information regarding weather or environmental predictions in a region proximate farming area 1306. In some implementations, one or more sensors 1320, 1322 can be used in combination with one or more internet-based services to identify and predict environmental conditions proximate farming area 1306.

Vehicle control system 1316 may use this sensor data and predictions to estimate the time required to recharge a battery in tractor 1302, 1304. The estimated time required to recharge a battery in tractor 1302, 1304 may be used to determine which jobs or activities a tractor should perform on a particular day. For example, on a cloudy day the battery recharging time will be greater, so it may be advantageous to perform jobs that don't require as much energy (e.g., spraying a field instead of plowing the field) to get the most work performed from a battery charge. As discussed herein, the information provided by sensors 1320 and 1322 are used by environment monitoring system 1318 to determine whether the batteries in both tractors 1302, 1304 can be charged simultaneously or need to be charged independently.

In some embodiments, vehicle control system 1316 controls the charging of tractors 1302 and 1304 based on the available energy generated by solar cells 1312 in the current environment. For example, if the available energy generated by solar cells 1312 in the current environment is sufficient to charge both tractors 1302, 1304 simultaneously, then the energy generated by solar cells 1312 may be split between tractors 1302, 1304 if they are both in a vehicle charging station 1308, 1310 at the same time. If there is sufficient energy generated by solar cells 1312 to charge both tractors 1302, 1304, but only one tractor is in a vehicle charging station 1308, 1310, a portion of the energy may be provided to the tractor in the vehicle charging station and the remaining energy may be stored in battery 1314 for future use. Alternatively, all of the energy may be provided to the tractor in the vehicle charging station to charge the tractor at a faster rate. If the weather is poor (e.g., cloudy or rainy), there may only be enough solar energy to charge one tractor. In this situation, vehicle control system 1316 may decide to assure that one of the tractors 1302, 1304 gets the amount of energy it needs to perform its programmed activities.

In particular implementations, vehicle control system 1316 knows the maximum acceptable charging current of each tractor 1302, 1304. If the current received from one or more solar cells 1312 exceeds the maximum charging current of a particular tractor 1302, 1304, vehicle control system 1316 may turn off a portion of the solar cells to reduce the received current to the maximum (or less than maximum) charging current acceptable by the vehicle. In some embodiments, vehicle control system 1316 regularly monitors the current received from solar cells 1312 and makes adjustments, as needed, to the current provided to one or more tractors 1302, 1304. This regular monitoring is useful when the sunlight intensity changes due to clouds or other factors. The changing sunlight intensity may alter the current generated by solar cells 1312 which may require adjustment to the number of solar cells charging a particular tractor 1302, 1304.

In some embodiments, environment monitoring system 1318 monitors any number of environmental factors to determine an operating efficiency and expected energy generation by solar cells 1312. The expected energy generation may be provided to vehicle control system 1316 to determine how much energy to provide to one or more tractors. In other embodiments, multiple PV strings are provided from solar cells 1312 to vehicle charging stations 1308 and 1310. In these embodiments, vehicle control system 1316 controls which of the multiple PV strings are currently connected to each vehicle charging station 1308, 1310.

In some embodiments, vehicle control system 1316 may monitor one or more tractors 1302, 1304 when they are connected to one of the vehicle charging stations 1308, 1310. The vehicle control system 1316 may adjust the charging of one or more tractors 1302, 1304 based on which tractor needs more charging, how much energy is currently available from solar cells 1312, what charging priorities are assigned to the tractors or what work priorities are assigned to the tractor tasks, and the like.

In some embodiments, one or more tractors 1302, 1304 may have removable batteries that can be removed and recharged at any of the vehicle charging stations 1308, 1310. For example, one of the tractors 1302, 1304 may return to one of the vehicle charging stations 1308, 1310 when its battery is low on energy. One or more of the tractor's batteries is removed at the vehicle charging station and connected to a battery recharging system. A fully charged battery is then inserted into the tractor, such that the tractor can continue operating while the depleted battery is recharged. In some implementations, machines, robots, carts, and the like are used to remove batteries from a tractor and insert another (charged) battery into the tractor.

In some embodiments, a first tractor (e.g., tractor 1302) can charge a second tractor (e.g., 1304) by transferring energy from a battery in the first tractor to a battery in the second tractor. In other embodiments, any tractor 1302, 1304 can charge a battery (e.g., battery 1314).

In the example of FIG. 13, the energy generated by solar cells 1312 may pass through vehicle control system 1316. In other embodiments, the energy generated by solar cells 1312 may be communicated directly to vehicle charging stations 1308, 1310 under the control of vehicle control system 1316.

In some embodiments, one or more tractors 1302, 1304 may have attached solar cells that generate energy. The energy generated by the tractor-mounted solar cells may provide energy to, for example, operate the tractor or charge a battery contained in the tractor.

The example of FIG. 13 illustrates charging of multiple tractors 1302, 1304 using energy generated by solar cells 1312. In other embodiments, the energy generated by solar cells 1312 may be augmented with energy from a local power grid. The energy from the local power grid may be used on cloudy days or in other situations where solar cells 1312 do not generate enough energy to efficiently charge and operate tractors 1302, 1304. In some embodiments, energy from the local power grid may be used at night to at least partially recharge batteries in tractors 1302, 1304. In particular implementations, vehicle control system 1316 can monitor power taken from the power grid to avoid overloading the power grid. For example, there may be situations where the solar cells 1312 alone are not sufficient to charge one or more tractors, and the power grid alone is not sufficient to charge one or more tractors. By combining energy from solar cells 1312 as well as the power grid, there may be sufficient energy to charge one or more tractors without overloading the power grid.

Figure 14:
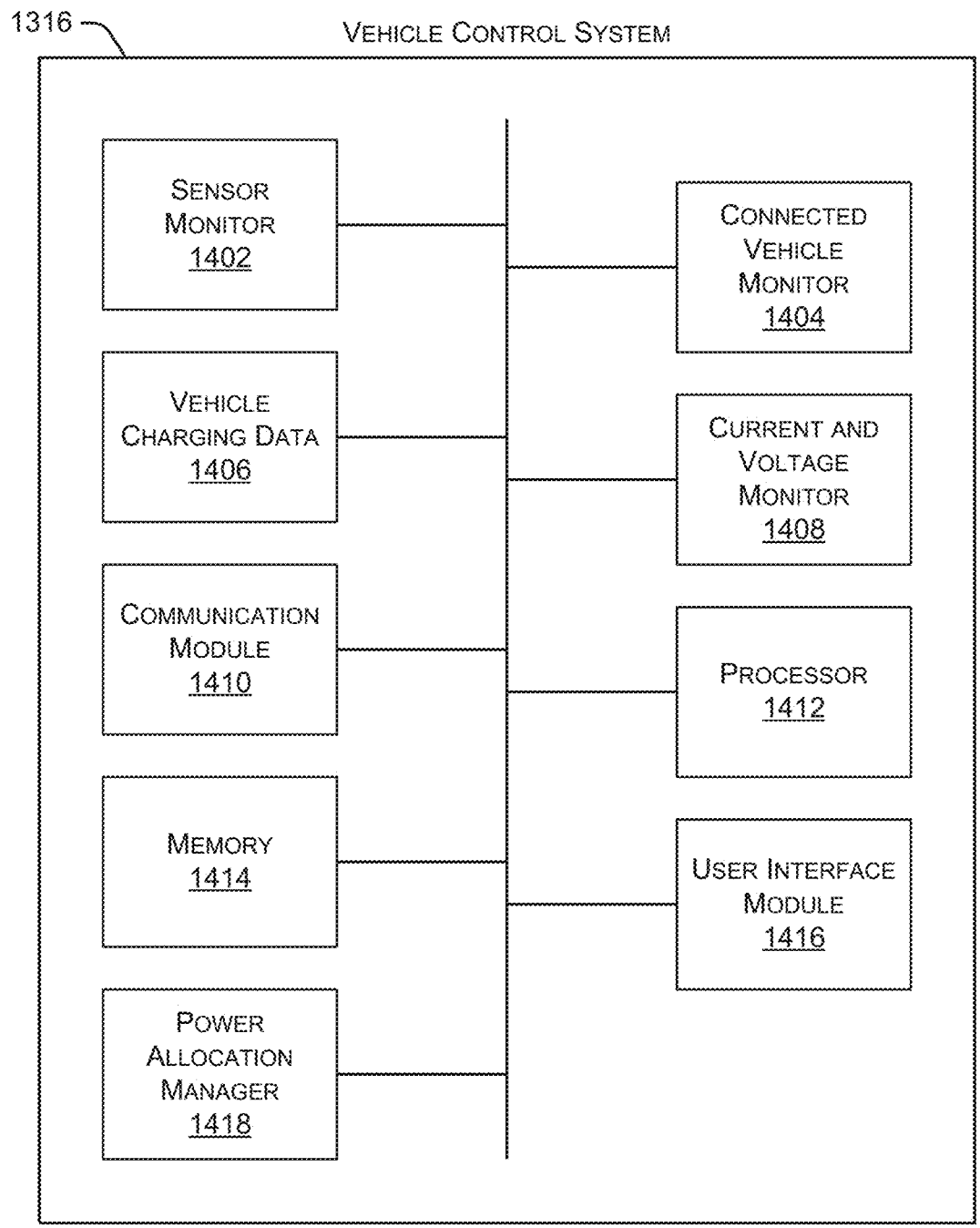
FIG. 14 is a block diagram depicting an embodiment of a vehicle control system.

FIG. 14 is a block diagram depicting an embodiment of vehicle control system 1316. In this example, vehicle control system 1316 includes a sensor monitor 1402 and a connected vehicle monitor 1404. Sensor monitor 1402 is capable of monitoring data provided by multiple sensors, such as sensors 1320 and 1322. Connected vehicle monitor 1404 operates to monitor one or more tractors 1302, 1304 located in a vehicle charging station 1308, 1310. For example, connected vehicle monitor 1404 may monitor a vehicle type, a type of charger required, a maximum charging current, and an active charging status (such as state of charge, or SOC, percentage) of the vehicle's battery.

Vehicle control system 1316 also includes vehicle charging data 1406 and a current and voltage monitor 1408. Vehicle charging data 1406 may include how much energy has been provided to particular tractors 1302, 1304 during any time period (e.g., energy provided during the current hour, day, week, month and so forth). Current and voltage monitor 1408 monitors and adjusts, as needed, the voltage level of the output signal provided to one or more tractors 1302, 1304. In some embodiments, current and voltage monitor 1408 also monitors and adjusts the level of the current (or any other signal characteristics) associated with the energy provided to one or more tractors 1302, 1304. For example, current and voltage monitor 1408 can control the voltage independently of the current. Alternatively, current and voltage monitor 1408 can control the current independently of the voltage. In additional embodiments, current and voltage monitor 1408 may include (or may utilize) an inverter that converts DC signals to AC signals, as well as to manage voltage and current.

In some embodiments, vehicle control system 1316 includes a communication module 1410 and a processor 1412. Communication module 1410 allows vehicle control system 1316 to communicate with other systems or devices via any communication medium and using any communication protocol. For example, communication module 1410 may communicate with other communication modules, communication processors, cloud-based servers, machine learning algorithms, artificial intelligence algorithms, robotic systems, and the like. Processor 1412 performs various functions necessary to perform the methods and operations discussed herein with respect to charging electric vehicles. A memory 1414 stores various data used by the described systems and methods as well as other components and modules in vehicle control system 1316.

A user interface module 1416 allows a user to interact with vehicle control system 1316 and perform various operations, such as entry of user requirements, system configuration, data access, data reporting, user billing, and the like. A power allocation manager 1418 manages the allocation of power (or energy) from one or more sources (e.g., solar cells, external battery, another electric vehicle, or a power grid) to one or more tractors 1302, 1304 or other devices or systems. For example, power allocation manager 1418 may allocate energy received from multiple solar cells among the electric vehicles currently being charged. The allocation may distribute the energy equally among all electric vehicles or may distribute the energy, for example, in proportion to the charging needs of each electric vehicle, the time available to charge each electric vehicle, environmental factors such as the weather that influence how much solar energy is available for charging, and the like.

Figure 15:
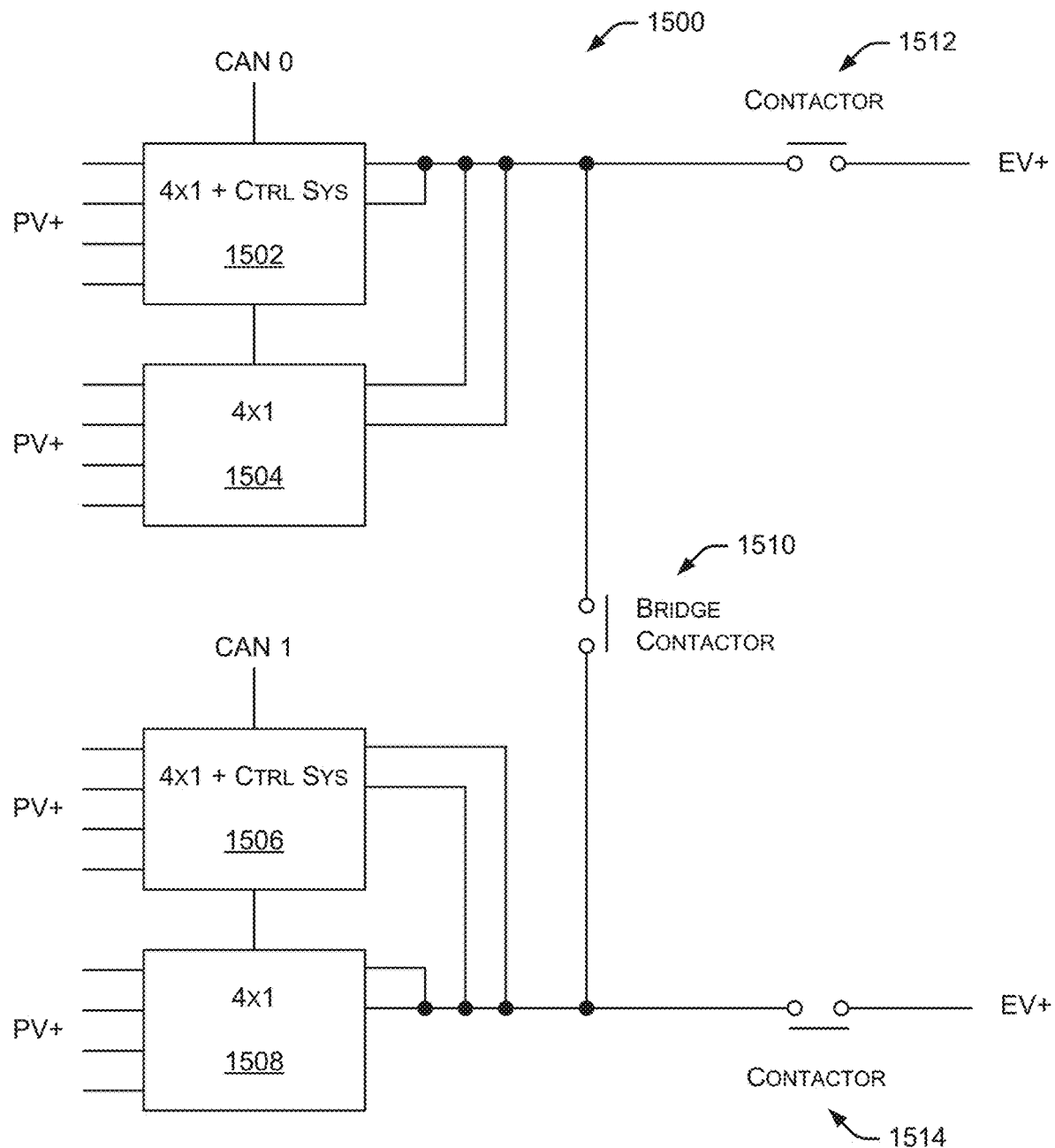
FIG. 15 illustrates an example power control system.

FIG. 15 illustrates an example power control system 1500. As shown in FIG. 15, four blocks 1502, 1504, 1506, and 1508 each receive multiple PV strings from solar cells 1312. Blocks 1502 and 1506 also include a control system to control other blocks. For example, block 1502 controls block 1504, and block 1506 controls block 1508. In some embodiments, the control system in blocks 1502 and 1506 may be a CCS (combined charging system) interface a Chademo interface, a GB/T interface, and the like.

In the example of FIG. 15, each block 1502-1508 can output power from any number (e.g., 1-4) of PV inputs. Thus, rather than activating all the PV strings for a block simultaneously, the control system can slowly activate any number of PV strings sequentially (e.g., step up the power). The manner in which power is stepped up for a particular electric vehicle (e.g., tractor) may vary based on the requirements and recommendations of the particular electric vehicle. In particular implementations, each vehicle can notify vehicle control system 1316 a maximum current the vehicle can safely handle. In the embodiment of FIG. 15, blocks 1502 and 1506 are connected to a CAN (Controller Area Network) bus, labeled CAN 0 and CAN 1, for control of blocks 1502-1508 by vehicle control system 1316 and also for communication with other devices and systems.

A bridge contactor 1510, contactor 1512, and contactor 1514 provide various connection options for distributing power from blocks 1502-1508 to two or more electric vehicles (e.g., tractors 1302, 1304) labeled as EV+. For example, on a sunny day, bridge contactor 1510 may be open and contactor 1512 may be closed such that the power from blocks 1502 and 1504 flows to one EV+ and contactor 1514 is closed such that the power from blocks 1506 and 1508 flows to the other EV+. In contrast, on a cloudy day, bridge contactor 1510 may be closed, contactor 1512 is closed, and contactor 1514 is open. Thus, power from all four blocks 1502-1508 may flow to a single electric vehicle.

In some embodiments, bridge contactor 1510, contactor 1512, and contactor 1514 are controlled (e.g., opened or closed) by vehicle control system 1316 discussed above with respect to FIG. 13. For example, vehicle control system 1316 may control bridge contactor 1510, contactor 1512, and contactor 1514 based on environmental factors and other data. Additionally, vehicle control system 1316 may control activation of the PV strings for blocks 1502-1508. In some embodiments, the control signals are communicated from vehicle control system 1316 using CAN bus connections CAN 0 and CAN 1.

Figure 16:
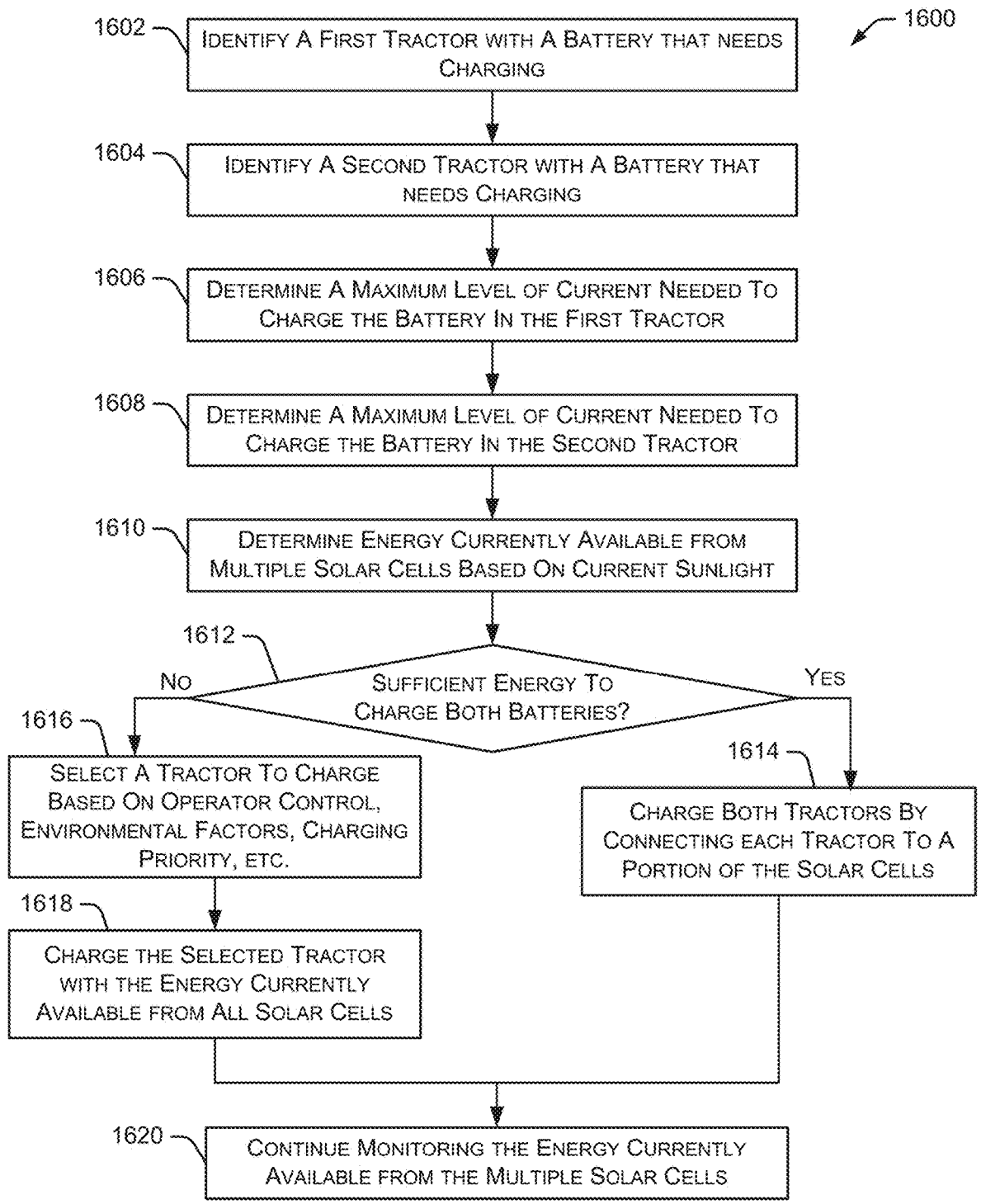
FIG. 16 illustrates an embodiment of a method for managing the distribution of power from multiple solar cells to multiple vehicles.

FIG. 16 illustrates an embodiment of a method 1600 for managing the distribution of energy from multiple solar cells to multiple vehicles. Initially, method 1600 identifies 1602 a first tractor with a battery that needs charging and identifies 1604 a second tractor with a battery that needs charging. Method 1600 also determines 1606 a maximum level of current needed to charge the battery in the first tractor and determines 1608 a maximum level of current needed to charge the battery in the second tractor. The method continues by determining 1610 the energy currently available from multiple solar cells based on the current sunlight (e.g., the current sunlight intensity).

Method 1600 further determines 1612 whether sufficient energy is available from the solar cells to charge both batteries (e.g., the batteries in tractors 1302 and 1304) at the same time. If there is sufficient energy to charge both batteries, then both tractors 1302 and 1304 are connected to a portion of the solar cells so they can be charged 1614 simultaneously. The method continues at 1620 by continuing to monitor the energy currently available from the multiple solar cells.

If method 1600 determines at 1612 that there is not sufficient energy to charge both batteries at the same time, the method selects 1616 a tractor to charge based on, for example, operator control, an algorithm that makes vehicle charging decisions based on a priority of use cases, the amount of sunlight available to charge the vehicles, other environmental factors, and the like. The selected tractor is then charged 1618 with the energy currently available from all solar cells. The method continues at 1620 by continuing to monitor the energy currently available from the multiple solar cells.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus comprising:
    a vehicle charging station proximate a plurality of solar cells configured to generate energy; and
    a vehicle control system coupled to the plurality of solar cells and configured to:
        identify a first electric tractor with a first battery;

determine whether the first battery needs charging;
identify energy available from the plurality of solar cells;
responsive to determining that the first battery needs charging:
  instruct the first electric tractor to drive to the vehicle charging station; and
  charge the first battery using energy from the plurality of solar cells.

2. The apparatus of claim 1, further comprising an environmental monitoring system coupled to the vehicle control system and configured to detect at least one environmental condition.

3. The apparatus of claim 2, wherein the at least one environmental condition is detected by the environmental monitoring system.

4. The apparatus of claim 2, wherein the at least one environmental condition is determined by at least one of a data source or an internet-based service that provides data regarding one or more environmental conditions proximate the plurality of solar cells.

5. The apparatus of claim 2, wherein the at least one environmental condition includes at least one of solar light intensity, air temperature, or wind speed.

6. The apparatus of claim 1, wherein the first electric tractor is operating within a predefined area.

7. The apparatus of claim 6, wherein the first electric tractor is an agricultural vehicle operating within a farming area.

8. The apparatus of claim 1, wherein the first tractor has a removable battery, and wherein the removable battery is removed from the first tractor at the vehicle charging station and replaced with a charged battery.

9. The apparatus of claim 1, wherein the plurality of solar cells have a plurality of photovoltaic (PV) strings, wherein any number of PV strings can be assigned to a particular electric tractor by the vehicle control system.

10. The apparatus of claim 1, further comprising augmenting the energy from the plurality of solar cells with energy from a power grid.

11. A method comprising:
identifying a first electric tractor with a battery;
determining whether the battery needs charging;
identifying energy available from a plurality of solar cells; and
responsive to determining that the battery needs charging:
  instructing the first electric tractor to drive to a vehicle charging station proximate the plurality of solar cells; and
  charging the battery of the first electric tractor using energy from the plurality of solar cells.

12. The method of claim 11, further comprising:
determining a maximum level of current needed to charge the battery; and
charging the battery by providing the maximum level of current to the battery.

13. The method of claim 11, further comprising:
identifying a second electric tractor with a second battery that needs charging;
determining whether the energy available from a plurality of solar cells is sufficient to charge both the first electric tractor and the second electric tractor; and
determining whether to charge one or both electric tractors based on the energy available from the plurality of solar cells.

14. The method of claim 13, further comprising charging the first electric tractor and the second electric tractor simultaneously if the energy available from the plurality of solar cells is sufficient to charge both the first electric tractor and the second electric tractor.

15. The method of claim 13, further comprising selecting the first electric tractor or the second electric tractor if the energy available from the plurality of solar cells is not sufficient to charge both electric tractors.

16. The method of claim 15, wherein selecting the first electric tractor or the second electric tractor is based on at least one of operator control, environmental factors, or charging priorities.

17. A method comprising:
identifying a first tractor with a first battery that needs charging;
identifying a second tractor with a second battery that needs charging;
determining a maximum level of current needed to charge the first battery;
determining a maximum level of current needed to charge the second battery;
determining energy available from a plurality of solar cells;
determining whether the energy available from a plurality of solar cells is sufficient to charge both the first battery and the second battery;
responsive to determining that the energy available from the plurality of solar cells is sufficient to charge both the first battery and the second battery, charging both the first battery and the second battery simultaneously; and
responsive to determining that the energy available from the plurality of solar cells is not sufficient to charge both the first battery and the second battery:
  selecting one of the tractors to charge; and
  charging the battery associated with the selected tractor.

18. The method of claim 17, wherein selecting one of the tractors to charge is based on at least one of operator control, environmental factors, or charging priorities.

* * * * *